Sept. 4, 1951      J. W. MILLER      2,566,423
APPARATUS FOR FORMING TUBES
Filed Aug. 10, 1946      12 Sheets-Sheet 1
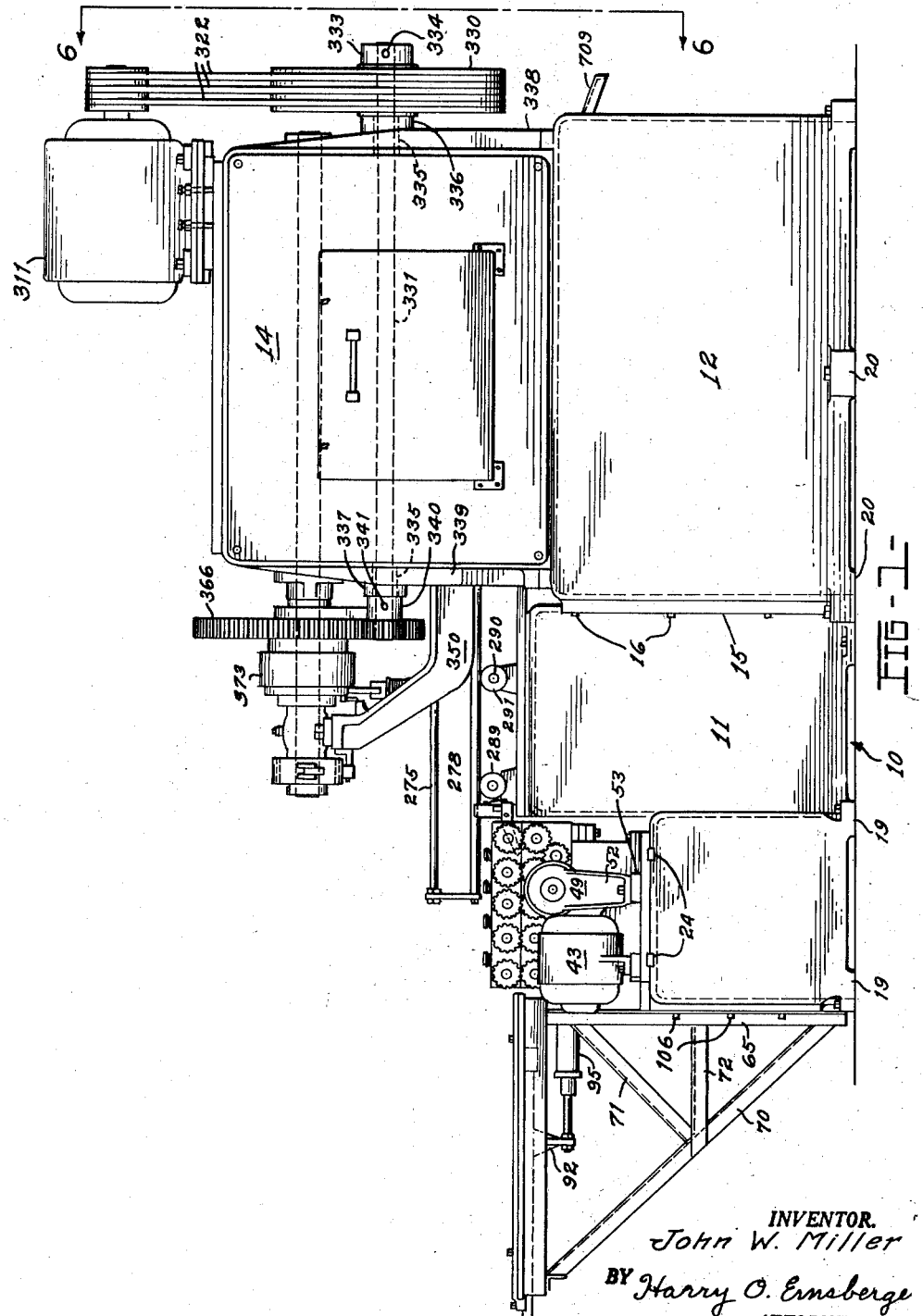
INVENTOR.
John W. Miller
BY Harry O. Ernsberger
ATTORNEY.

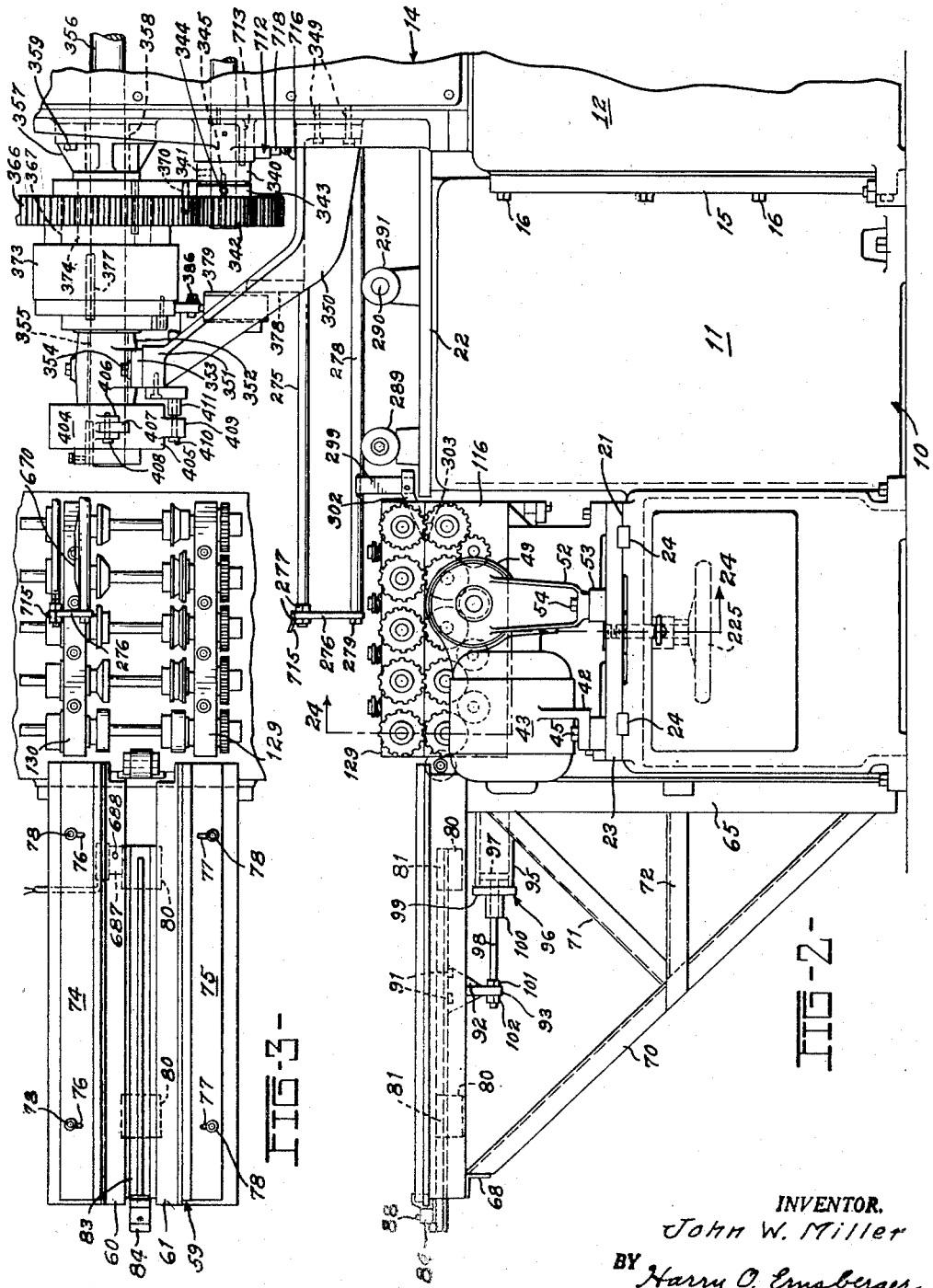

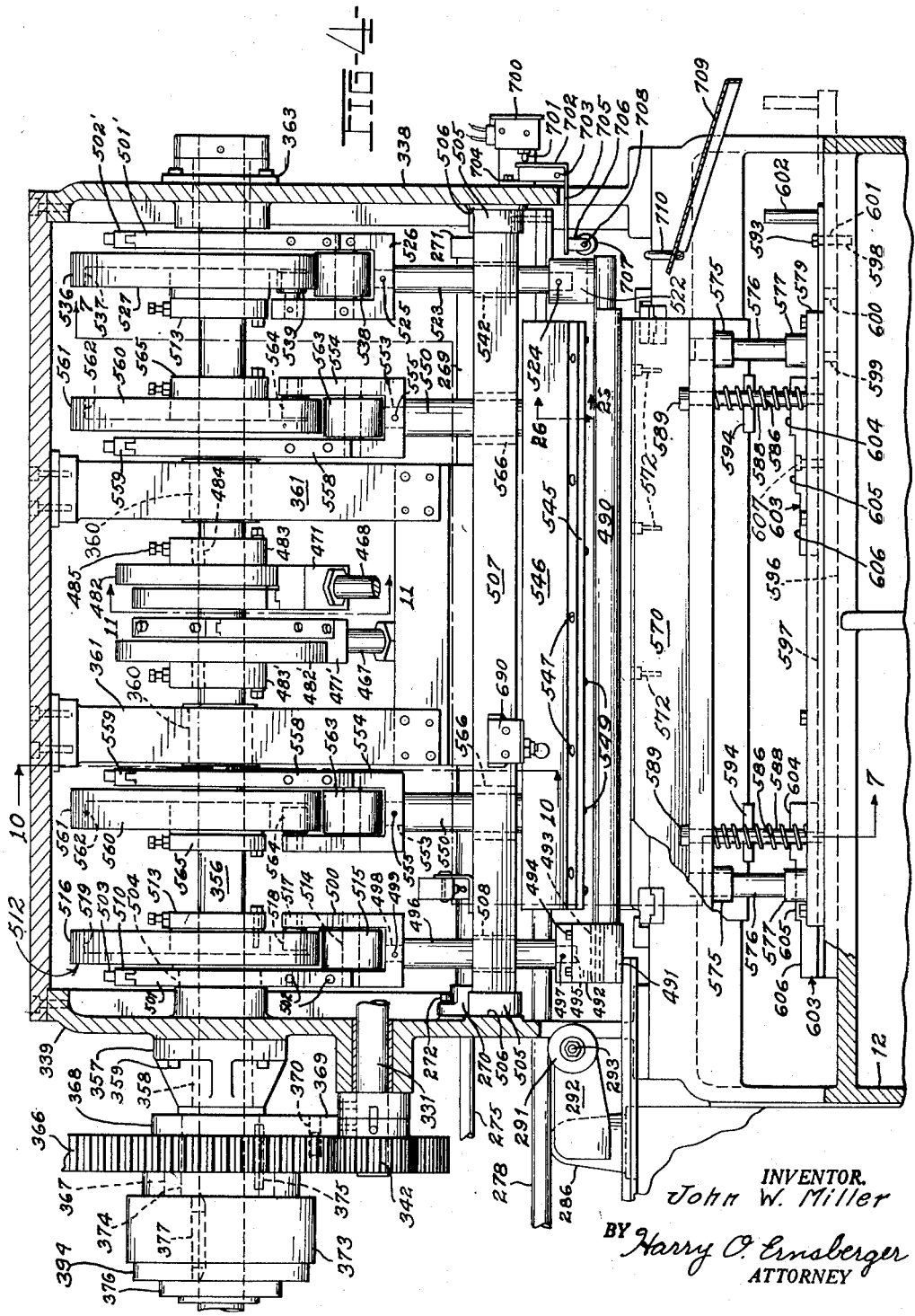

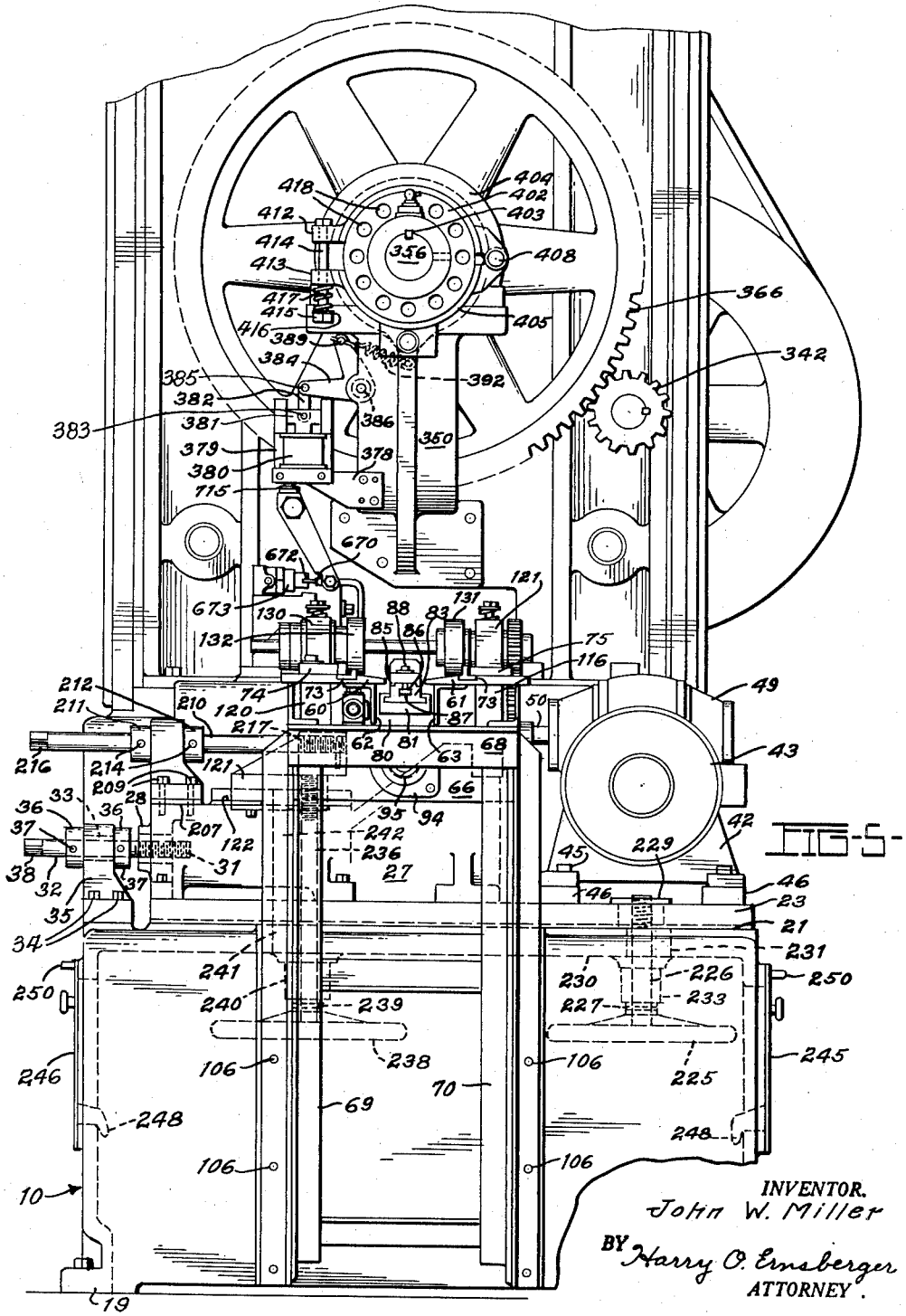

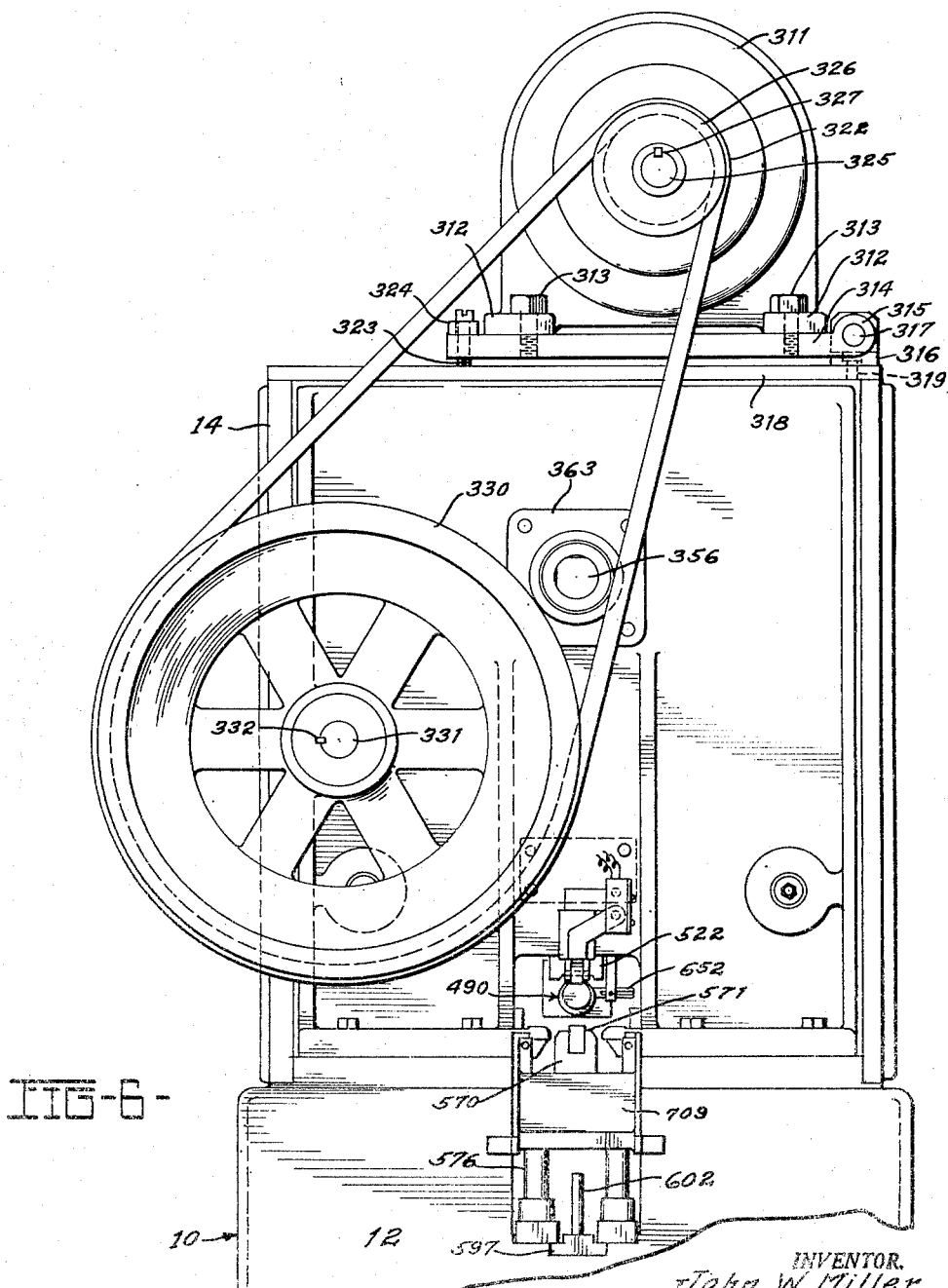

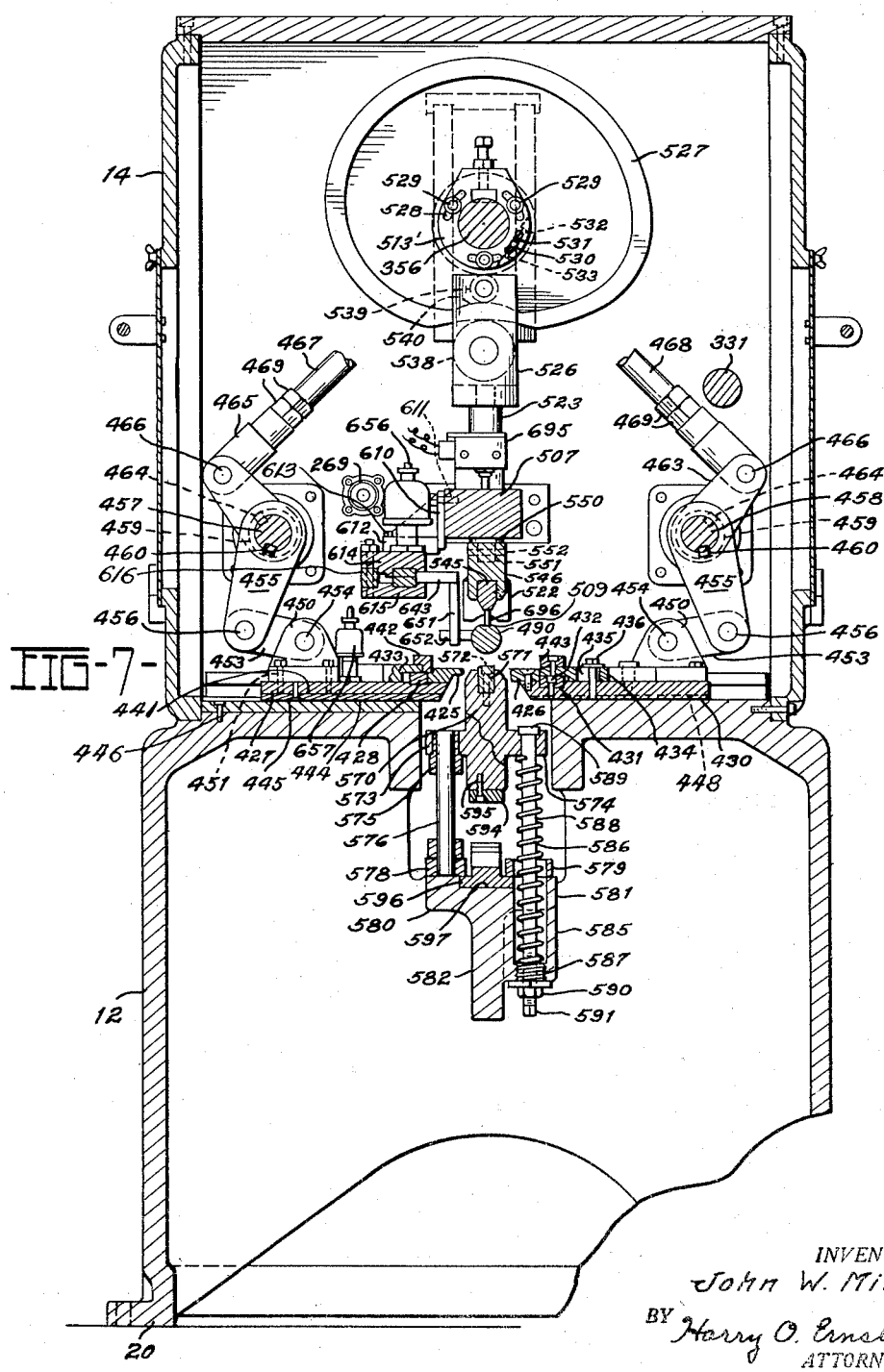

Sept. 4, 1951  J. W. MILLER  2,566,423
APPARATUS FOR FORMING TUBES
Filed Aug. 10, 1946  12 Sheets-Sheet 7
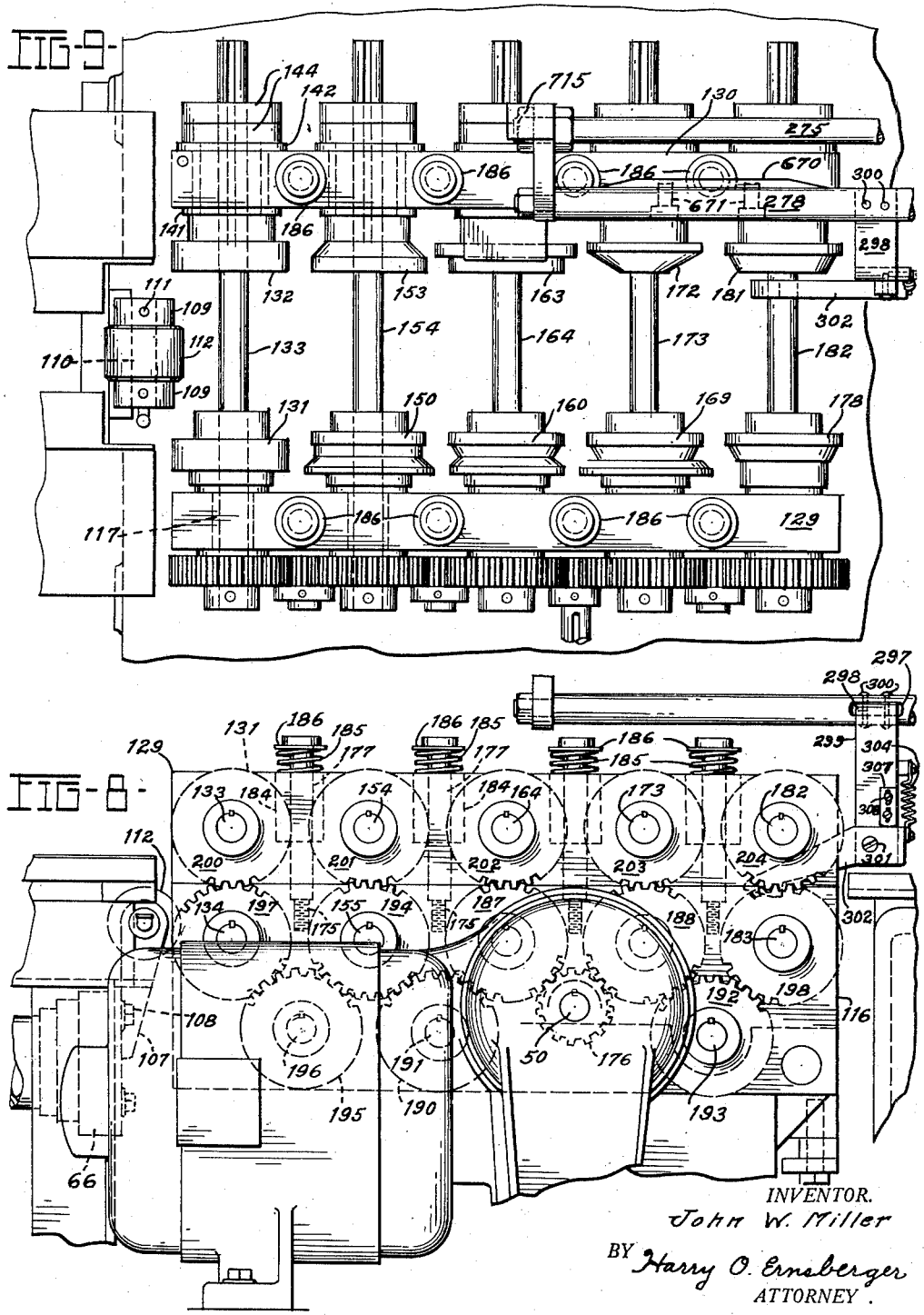

Sept. 4, 1951  J. W. MILLER  2,566,423
APPARATUS FOR FORMING TUBES
Filed Aug. 10, 1946  12 Sheets-Sheet 8
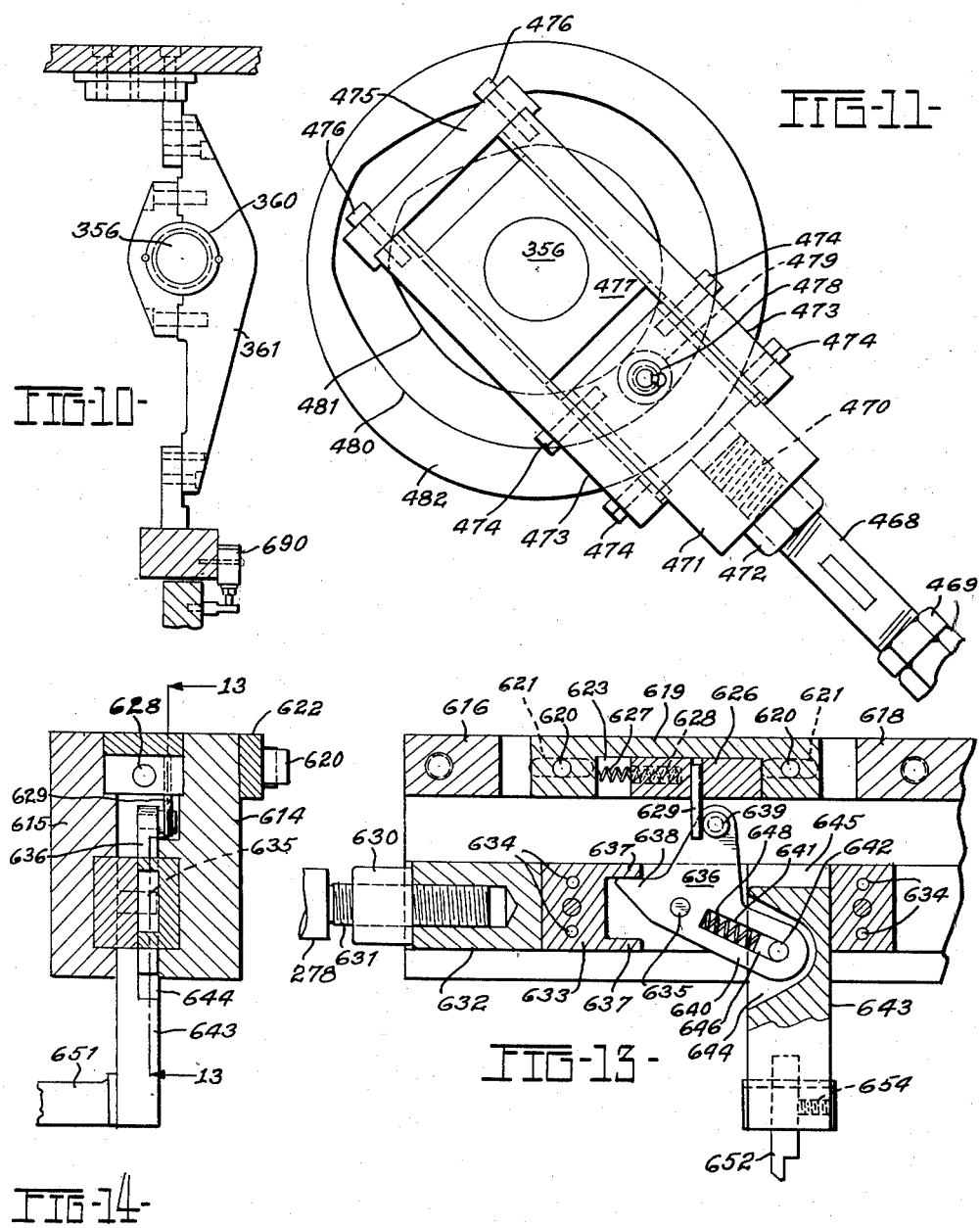
INVENTOR.
John W. Miller
BY Harry O. Ernsberger
ATTORNEY

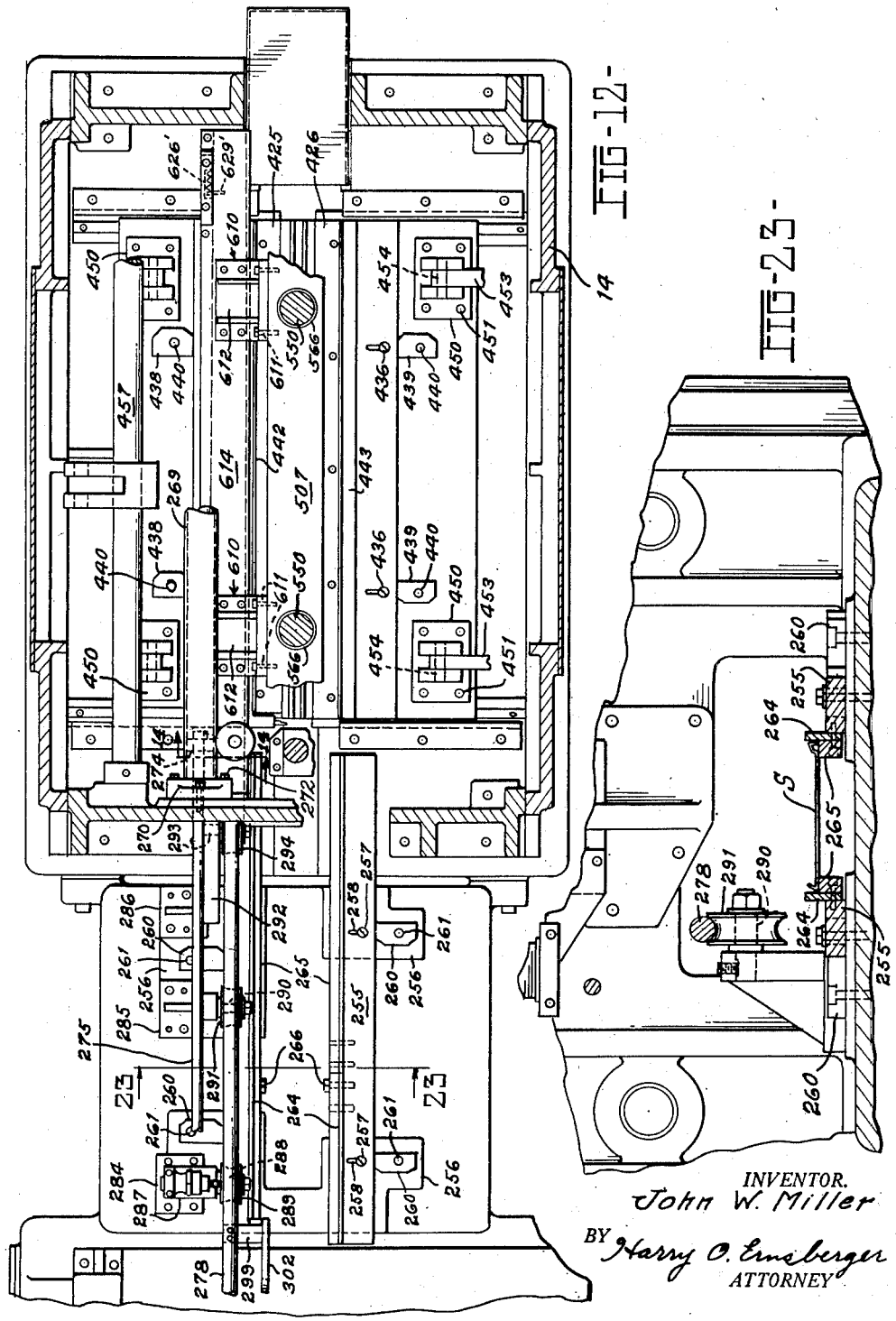

Sept. 4, 1951  J. W. MILLER  2,566,423
APPARATUS FOR FORMING TUBES
Filed Aug. 10, 1946  12 Sheets-Sheet 10
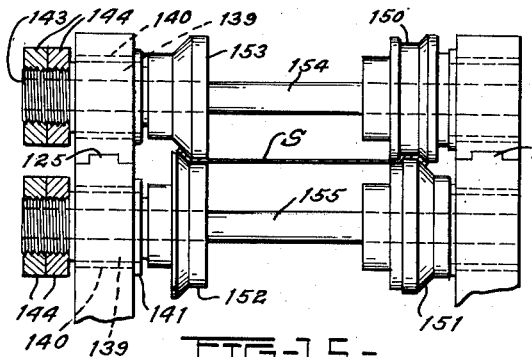
FIG-15-
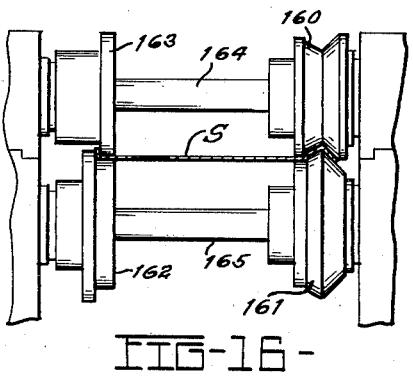
FIG-16-
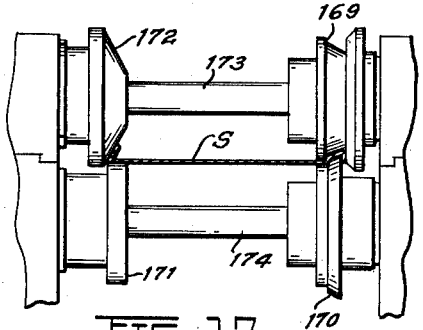
FIG-17-
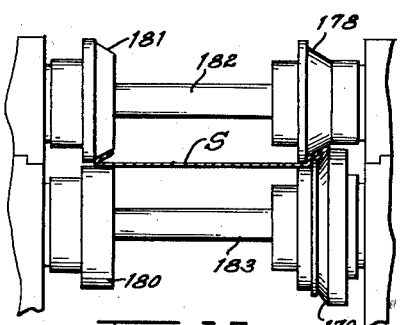
FIG-18-
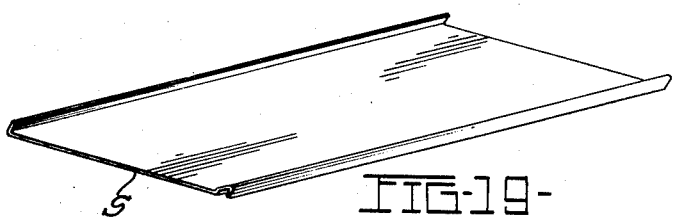
FIG-19-
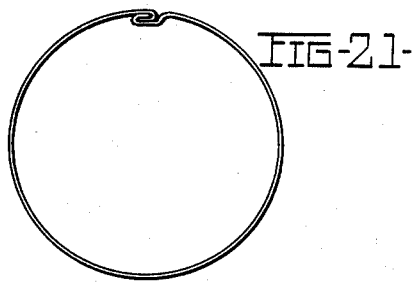
FIG-21-
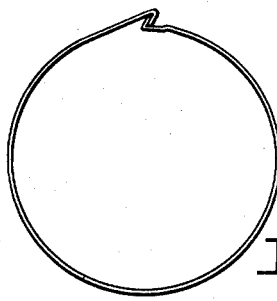
FIG-20-
INVENTOR.
John W. Miller
BY Harry O. Ernsberger
ATTORNEY

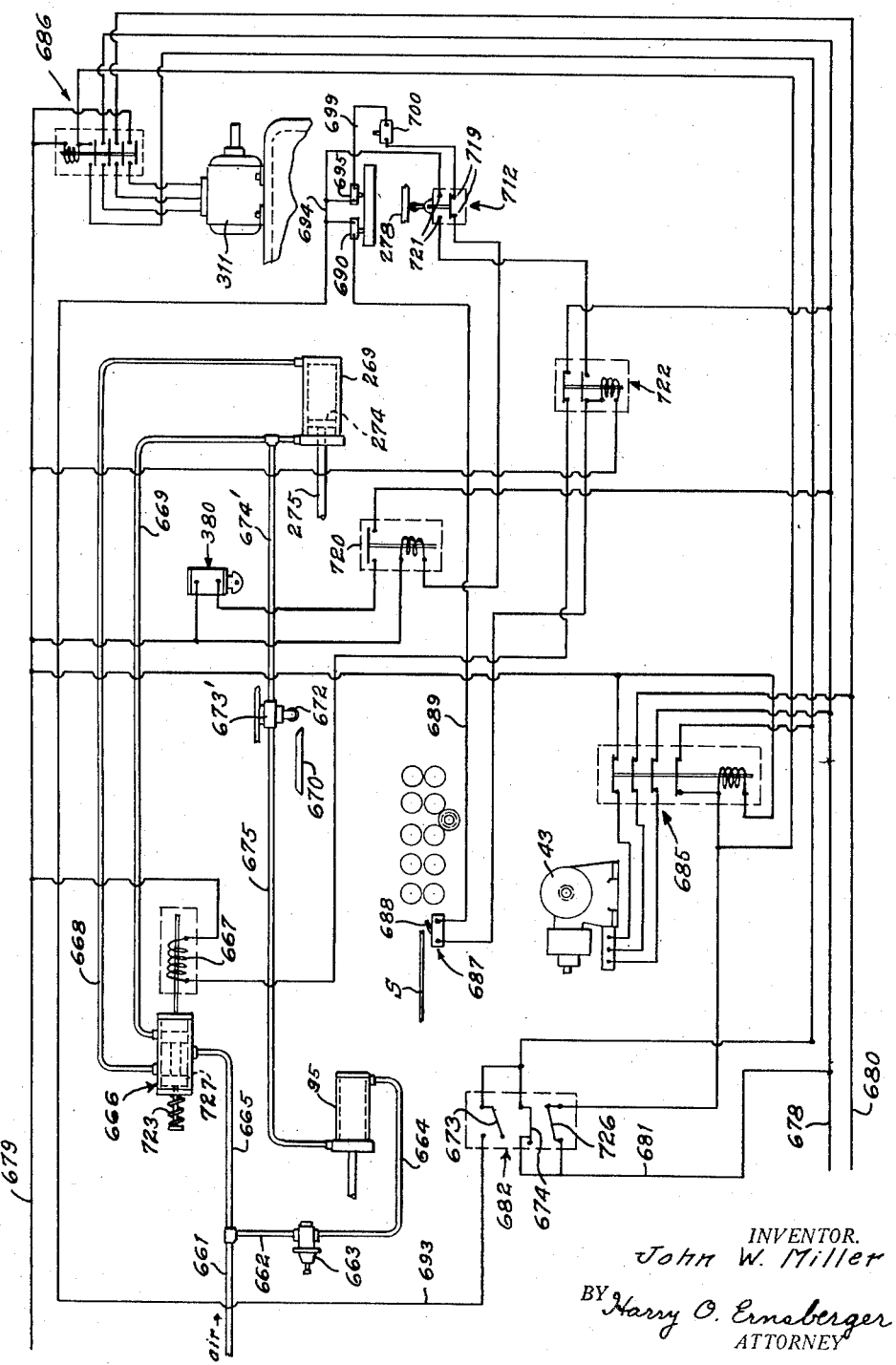

Sept. 4, 1951  J. W. MILLER  2,566,423
APPARATUS FOR FORMING TUBES
Filed Aug. 10, 1946  12 Sheets-Sheet 12
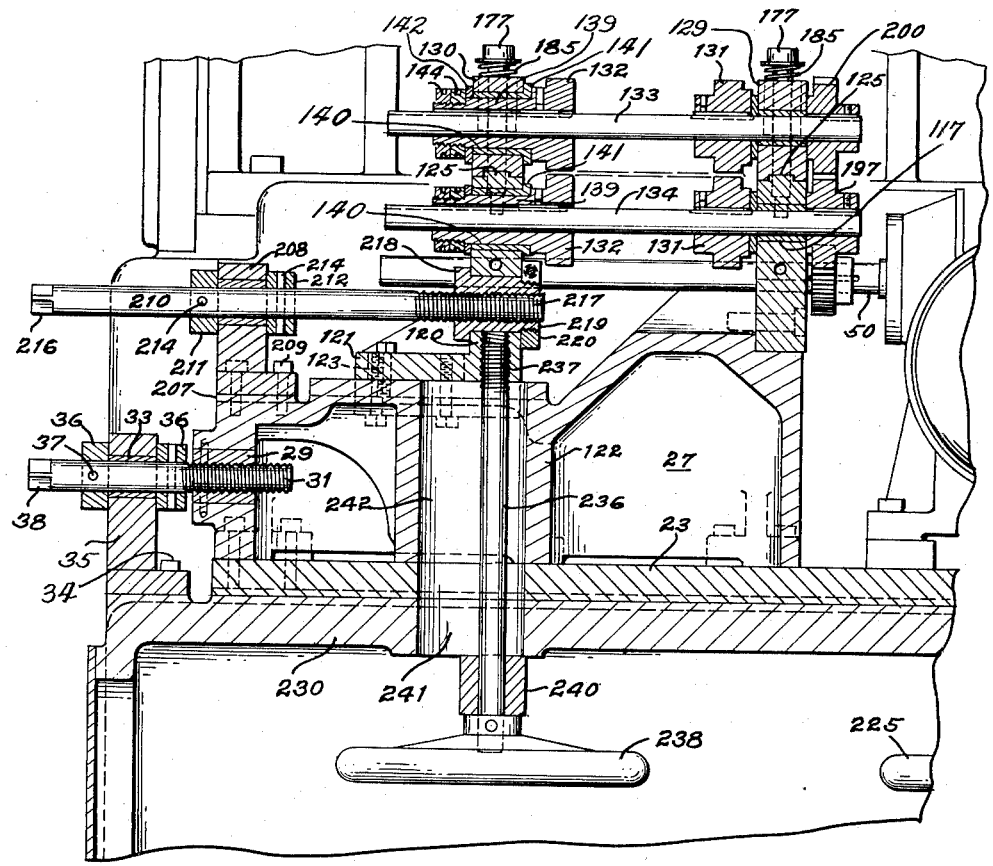
FIG-24-
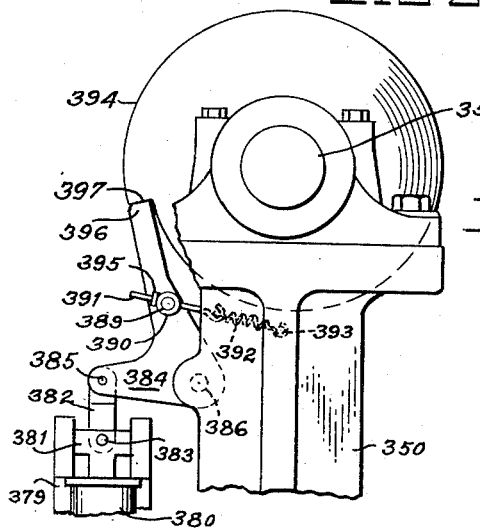
FIG-25-
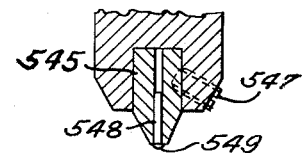
FIG 26.
INVENTOR.
John W. Miller
BY Harry O. Ernsberger
ATTORNEY Patented Sept. 4, 1951

2,566,423

UNITED STATES PATENT OFFICE 2,566,423

APPARATUS FOR FORMING TUBES

John W. Miller, Toledo, Ohio, assignor to Miami Industries, Inc., Toledo, Ohio, a corporation of Ohio Application August 10, 1946, Serial No. 689,638

5 Claims. (Cl. 113—34)

This invention relates to apparatus for forming tubing and more especially to the formation of seamed tubing from sheet metal.

The invention comprehends apparatus for configurating the edge portions of strips of sheet metal and forming the configurated strips to substantially circular cross section, and interlocking the edge formations of the strips to provide a lock-seam tube.

The invention embraces the provision of apparatus for forming seamed tube constructions especially usable as components of muffler assemblies and wherein the finished tube will be of uniform cross sectional dimension throughout its length.

An object of the invention resides in the provision of a tube forming apparatus wherein substantially flat strips of material are fed into the machine and wherein the latter automaticaly performs a sequence of operations upon each strip whereby the same is configurated to closed tubular formation and the finished tube is extruded or ejected from the machine.

Another object of the invention resides in the provision of an apparatus embodying a plurality of forming rolls adapted to pre-configurate the edge portions of strips of sheet metal to preform the elements of an interlocking joint, the machine embodying means for automatically conveying the pre-configurated strips of metal to a bending and seam forming station, at which station automaticaly operated means bends the strip to a closed configuration and interlocks the pre-configurated edges to produce a seamed tube of accurate cross sectional dimension throughout the length of the tube.

Another object of the invention resides in the provision of an apparatus for fabricating lock-seam tubing wherein the multi-thickness of metal forming the lock-seam or joint projects or extends interiorly of the formed tube, thus providing a substantially smooth uninterrupted exterior surface for the tube.

Another object of the invention resides in the provision of a machine for forming lock-seam tubing embodying means of adjustment for the various mechanisms, whereby the machine or apparatus is rendered adaptable for producing tubes of various sizes.

Another object of the invention resides in apparatus for forming lengths of tubing from sheet metal, wherein the edges of the strips are preformed and wherein the inter-locking of the preformed edges and the formation of the lock-seam is accomplished in an operation simultaneously effected throughout the full length of the strip whereby the finished tube is of uniform diameter or dimension throughout its length.

A further object of the invention resides in a machine of this character in which electrically energized means and fluid under pressure are used as the motivating forces for automatically carrying on the several operations required in forming a tube construction, the machine embodying electrical circuit control and fluid control devices intercalated to automatically carry out the various operations in proper sequence.

Still a further object of the invention resides in the provision of a machine for forming lock-seam tubing wherein forming elements are controlled by a plurality of cam means arranged to exert comparatively high pressures upon the strip being formed to tubular configuration whereby a high degree of accuracy for the finished tube is assured.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention which may be preferred, in which:

Figure 1 is a side elevational view of the machine of my invention;

Figure 2 is a side elevation view showing a portion of the machine;

Figure 3 is a top plan view of a portion of the machine shown in Figure 2;

Figure 4 is a side elevation view of another portion of the machine, part of the housing being shown in cross section;

Figure 5 is an end elevation view of the machine;

Figure 6 is an end elevational view of the opposite end of the machine, the view being taken substantially on the line 6—6 of Figure 1;

Figure 7 is a transverse vertical sectional view taken substantially on the line 7—7 of Figure 4;

Figure 8 is a fragmentary detail elevational view showing the forming roll unit and driving mechanism therefor;

Figure 9 is a top plan view of the construction shown in Figure 8;

Figure 10 is a fragmentary detail sectional view taken substantially on the line 10—10 of Figure 4;

Figure 11 is a fragmentary detail sectional view taken substantially on the line 11—11 of Figure 4;

Figure 12 is a plan view, the housing being shown in section, of the tube forming station;

Figure 13 is a fragmentary detail sectional view taken substantially on the line 13—13 of Figure 14;

Figure 14 is a sectional view taken substantially on the line 14—14 of Figure 12;

Figure 15 is a semi-diagrammatic view showing the first step in the method of forming edge portions of the metal strip or blank;

Figure 16 is a diagrammatic view showing a further step in the operation;

Figure 17 is a diagrammatic view showing a further step in the operation;

Figure 18 is a diagrammatic view showing a further step in the operation;

Figure 19 is an isometric view of the strip or blank having formed edge portions after passing through the forming rolls;

Figure 20 is an end view showing the blank bent to cylindrical configuration with the edge portions in an initial interlocking position;

Figure 21 is a view similar to Figure 20, showing the finished tube with the seam completely formed and locked;

Figure 22 is a schematic view or diagram illustrating the mechanism actuating and controlling devices and circuits therefor;

Figure 23 is a fragmentary sectional view taken substantially on the line 23—23 of Figure 12;

Figure 24 is a vertical sectional view taken substantially on the line 24—24 of Figure 2 showing the arrangement of adjusting the feed and form roll mechanism;

Figure 25 is an enlarged detail view illustrating the clutch controlling arm and electrically energized means actuating the same, and Figure 26 is an enlarged detail sectional view taken substantially on the line 26—26 of Figure 4.

While I have illustrated the method of my invention for forming seamed tubing from sheet metal, and the apparatus of my invention for carrying out the said method it is to be understood that I contemplate the utilization of the method and apparatus of my invention for fabricating or producing articles of manufacture other than the articles specifically disclosed, or wherever the same may be found to have utility.

In the utilization of the embodiment of my invention disclosed my improved method of forming lengths of tubing from flat sheet metal strips or blanks consists in the conveying flat strips of sheet metal successively into operative engagement with a plurality of forming rolls or other means adapted and arranged to configurate the edge portions of a sheet metal strip to the formation illustrated in Figure 19. The strip having its edges so configurated is then conveyed to a bending and seaming mechanism or station where the strip is bent or formed to the configuration illustrated in Figure 20, subsequent fixation or completion of the lock-seam being effected whereby the finished tubular construction is formed with a smooth or uninterrupted exterior surface, as particularly exemplified in Figure 21. Through the utilization of my method, and the apparatus for carrying out the method which will be hereinafter described, I am enabled to produce finished tubular constructions which are of uniform cross sectional configuration throughout their lengths. In prior known methods of lock-seam tubing, it has been heretofore difficult, if not impossible, to obtain a tubular construction which is of uniform cross sectional dimension throughout its length, which disadvantages have been eliminated through the employment of my method and apparatus as well as to produce uniform tubes in mass quantities.

With particular reference to the drawings in connection with the apparatus disclosed therein, the machine or mechanism is mounted upon a frame construction 10, which is preferably formed of unitary portions or castings 11, 12 and 14. The casting or frame portion 11 is formed forwardly and rearwardly with projecting flanges 15, which are secured to the frame portion 12 of the machine by means of bolts 16. The frame portions 11 and 12 are formed with pad portions 19 and 20 adapted to rest upon a suitable floor or other support.

The frame portion 11 is provided with two uniplanar surfaces 21 and 22, which are of different levels as shown in Figure 2. Mounted upon the surface 21, being the lower level, is a base or supporting plate 23. The upper portion of frame member 11 adjacent surface 21 is provided with a pair of parallel recesses or grooves adapted to receive and accommodate keys or ways 24, the same being fixedly secured by screws or other suitable means to the frame casting 11. The base plate 23 is reciprocally formed with recesses to snugly yet slidably accommodate the ways 24 so that the base plate may be adjusted in a transverse direction of the machine. Mounted upon the base plate 23 is a bracket or member 27, a rear wall of which is formed with a boss portion 28 bored to receive a hardened bushing 29, which is fixedly secured by suitable means in the boss portion 28. The bushing 29 is bored and threaded to receive a threaded member 31, the latter having an unthreaded or smooth portion 32, which extends through a bushing 33 mounted in a cylindrical opening formed in a bracket 35. The bracket 35 is relatively stationary and is secured to the frame portion 11 by suitable means of screws 34. Disposed at either side of the bracket 35 and surrounding the smooth portion 32 of member 31 are the collars 36, which are fixedly secured thereto by means of dowels 37. A projecting portion 38 of member 31 is of polygonal shape and adapted to receive a crank or other suitable manipulating tool (not shown). By rotating member 31 through the application of a crank to member 38, member 31 remains relatively stationary and moves the member 27 and the base plate 23 transversely of the machine, this adjustment being utilized for purposes to be hereinafter explained.

Mounted upon the base plate 23 at the forward portion thereof is a motor supporting bracket 42, upon which is mounted an electrically energizable motor 43. The bracket 42 is fixedly secured to the plate 23 by means of bolts 45, the motor support 42 being spaced from plate 23 by means of blocks 46. Also associated with the motor 43 is an enclosure or housing 49, in which is contained reduction gearing connected to and adapted to be driven by the motor 43. A shaft 50 extends from the housing 49 and is driven through the gearing (not shown) contained in the housing 49, the shaft 50 being adapted to drive a plurality of metal forming rolls. The housing 49 is formed with a depending bracket portion 52, which rests upon a spacing block 53 carried upon the base plate 23, the bracket 52 being secured to block 53 by means of screws 54.

Means are provided for supporting a strip or blank of material prior to its introduction into the forming rolls for processing. This means is inclusive of a strip supporting table 59 formed of plates 60 and 61, which are supported by longitudinally extending bars 62 and 63 welded or otherwise secured to the lower surface of the plates 60 and 61. The table construction for supporting the strips of sheet metal is supported by means of a skeleton metal frame which includes a pair of vertical struts being joined by means of a transversely extending member or bar 66, which is secured to the upright struts 65 by welding or other suitable means. As shown in Figure 5, the transverse bar 66 supports the inner ends of the bars 62 and 63. The rear extremities of bars 62 and 63 are welded to a transversely extending member 68 of L-shaped cross section, as shown in Figure 2. The bar 68 and the lower extremities of the upright struts 65 are joined together by diagonally disposed trusses 69 and 70, the latter being secured to the bar 68 and the struts 65 by welding or other suitable means. Further reinforcement is provided in the form of gusset strips or members 71, which are joined to the mid portions of the trusses 69 and 70 and to the upper ends of the upright struts 65, as shown in Figure 2. A further reinforcing means is provided for the frame, which includes horizontaly disposed bracing members 72, which are joined to mid points of trusses 69 and 70 and the upright struts 65. By this arrangement an extremely strong and stable means is provided for supporting the flat metal blanks prior to their being formed into tubular configurations.

The plates 60 and 61 are each provided with a longitudinally extending recess, within which is disposed a hardened plate 73 for the purpose of resisting wear as the metal blanks slide upon the plates 73 as they enter the forming rolls. Supported upon the plates 60 and 61 are gaging strips 74 and 75, each of the strips being formed with transversely extending slots 76 and 77. The gaging strips 74 and 75 are arranged to be secured to the plates 60 and 61 by means of securing bolts 78, the latter passing through the slots 76 and 77 and extending into threaded openings formed in the plates 60 and 61. The slots 76 and 77 provide for transverse adjustment of the plates to accommodate strips or blanks of different widths for producing tubes of different sizes. Adjustment of these strips may be attained by manipulation of the securing bolts 78.

Means are associated with the strip supporting table arranged to move the strips or blanks along the table and into engagement with the forming rolls. To this end there is disposed between and beneath the table plates 60 and 61 a pair of supporting blocks or members 80, upon each of which is supported a guide member 81 having inverted T-shaped recess formed therein. Slidably disposed in said recesses in blocks 81 is a longitudinally extending ram or bar 83 having a cross sectional contour adapted to be snugly, yet slidably, received into the recesses formed in the blocks 81. The ram 83 is longitudinally movable for the purpose of feeding strips of metal into the machine. Means are provided associated with the ram 83 to engage the strips to move the latter into the machine. To this end there is provided an abutment or stop member 84, having depending side portions 85, which overtake the edges of the ram 83 to properly locate the abutment transversely on the ram. The ram 83 is provided with an inverted T-shaped slot 86, which is adapted to receive the head portion of a bolt 87, the latter extending through the abutment 84, and through the cooperation of a nut 88 the abutment 84 may be adjusted longitudinally of the ram 83 and locked in any position therealong by tightening the nut 88. By this means various lengths of metal blanks may be utilized for making tubes of different lengths.

Means are provided for automatically moving the ram or bar 83 longitudinally for the purpose of moving the metal blanks or strips into the forming rolls. Secured to the lower surface of the ram 83 by means of screws 91 is a bracket 92, the latter being formed with a depending portion 93. Mounted upon the transversely extending bar 66 is a flanged fitting 94, which support a cylinder 95 of a fluid operated servo-motor 96. Reciprocally disposed within the cylinder 95 is a piston 97 secured to the inner end of a piston rod 98. The other end of cylinder 95 is provided with a fitting 99, having a boss portion 100 which contains a stuffing gland (not shown) for securing a fluid tight joint around the piston rod 98. The outer end of piston rod 98 is threaded and extends through an opening in the depending portion 93 of bracket 92. Lock nuts 101 and 102 are disposed at either side of portion 93 for fixedly securing the piston rod to the bracket 92. The fittings 94 and 99 are provided with openings to accommodate fittings adapted to convey air or other fluid under pressure to and from the cylinder 95 in order to actuate the piston and hence move the ram 83 and abutment 84 carried thereby.

The metal blank or strip supporting means is also inclusive of an anti-friction roller for supporting and guiding the blanks into the form rolls. In this connection there is provided a bracket 107, secured to the bar 66 by means of bolts 108, the bracket being formed with two upwardly extending spaced projections 109. The projections are provided with aligned openings arranged to receive a stub shaft 110, which is held in fixed position in projections 109 by means of lock screws 111. Disposed between the projections 109 and journaled for rotation upon the stub shaft 110 is a roller 112, the peripheral surface thereof being arranged to engage and support the metal blanks as they enter the form roll mechanism.

The associated mechanisms heretofore described are carried by the frame portion 11 by means of bolts 106 which pass through openings formed in the upright struts 65. The bolts extending into threaded openings formed in the frame portion 11.

The initial step in the formation of the flat strips of metal in producing tube constructions is performed by a series of juxtaposed sets of form rolls. In the particular embodiment of my invention illustrated, four sets of form rolls are employed to secure the desired edge configurations for the strips of metal. In addition, there is provided a set of feed rolls for feeding, guiding and retaining the strip in proper relation to the forming rolls during the configuration operations performed on the edges of the strip.

All of the sets of forming rolls and feed rolls are driven from the shaft 50 through reduction gearing from the motor 43. The shaft 50 is connected by trains of spur gears so as to drive all of the form rolls and the feed rolls at the proper speeds to process the metal strips.

As shown in Figures 2, 3, 5, 8, 9 and 24, there is mounted upon the member or bracket 27 a block or member 116, which forms a journal block having a plurality of openings, each of which receives and retains a bearing bushing 117 to facilitate the mounting of the shafts carrying the feed and form rolls. Spaced laterally from the block 116 is a second block 120, which is provided with a base portion 121, the latter being in the form of a plate which is welded to the block 120. The base portion 121 is configurated to rest upon and be supported by the boss portions 122, formed on the bracket 27. The base portion 121 is provided with slots 123 which are adapted to accommodate securing bolts 124 for adjusting the block 120 with respect to its support. The upper edge surfaces of each of the blocks 116 and 120 are formed with projecting tangs 125. Respectively disposed above each block is a second member or block 129 and 130 which blocks form journal supports for the uppermost feeding and forming rolls. Each of the blocks 129 and 130 is formed with a central recess or depression of a dimension to receive the tangs 125 formed on blocks 116 and 120, said tangs and recess construction serving to maintain the sets of blocks in proper aligned relationship.

As viewed in Figures 3 and 9 the extreme left hand set of rolls 132 and 131 are feed rolls for the purpose of feeding and retaining the metal strips as they subsequently pass through the forming rolls. The upper and lower feed rolls 131 and 132 are mounted respectively on shafts 133 and 134, and are keyed thereto by suitable means. The shafts carrying the feed rolls and other shafts carrying forming rolls are adapted to be driven through gear trains which will be hereinafter described. The feed rolls 132 are provided with tenon or journal portions 139, which are mounted in bearing bushings 140, fixed in the blocks 120 and 130 and provided with flanges 141. Disposed at one side of the blocks 120 and 130 and surrounding the journal portions 139 are thrust washers 142. The journal portions 139 of the rollers 132 terminate in threaded tenon portions 143, each tenon being arranged to receive a pair of lock nuts 144, which may be adjusted and locked to pre-determine the clearance permitted to the rolls 132, so that they will revolve freely but without substantial endwise movement.

Disposed adjacent the feed rolls 131 and 132 are the sets of forming rolls 150, 151, 152 and 153 for imparting a particular configuration to the opposite edge portions of the blank S. These forming rolls are particularly shown in Figures 3 and 15. The forming rolls 150 and 153 are secured to and driven by a shaft 154 while the forming rolls 151 and 152 are secured to and driven by the shaft 155. The shaft 154 is journaled in bearings mounted in blocks 129 and 130 in the same manner as shaft 133 is mounted in said blocks while shaft 155, carrying form rolls 151 and 152, is journaled in bearings in the same manner as shaft 134 carrying the lowermost feed rolls is journaled in bearings mounted in blocks 116 and 120. The form rolls 152 and 153 are secured against endwise movement in the same manner as feed rolls 132. The strip or blank S after passing through the form rolls 150, 151, 152 and 153 has the edge portions thereof configurated to the formation determined by the shape of the feed rolls, as shown in Figure 15.

The next operation performed upon the blank S is accomplished by the second set of form rolls, shown in Figure 16, the form rolls 160, 161, 162 and 163 being arranged to further bend and configurate the edge portions of the strip S. The upper rolls 160 and 163 are mounted upon a shaft 164 while the lower rolls 161 and 162 are mounted upon a shaft 165, the mounting arrangement being similar to the mounting arrangement of form rolls 150 through 153 inclusive.

The third set of form rolls for further configurating the edge portions of the blank S, is shown in Figure 17. The form rolls 169, 170, 171 and 172 performing this operation are arranged in pairs, the rolls 169 and 172 being mounted upon and driven by shaft 173, while rolls 170 and 171 are mounted upon and driven by a shaft 174.

The fourth and last stage of forming rolls for configurating the edge portions of the blank S are shown in Figure 18. The rolls 178, 179, 180 and 181 are arranged in pairs, the rolls 178 and 181 being mounted upon and driven by a shaft 182, while rolls 179 and 180 are mounted upon and driven by shaft 183. The formation or contour of the strip S, as it is extruded from the last set of form rolls is shown in Figure 19.

All of the feed and form rolls are driven through gearings associated with the motor driven shaft 50. As particularly shown in Figure 8, the spur gear 176 on shaft 50 is in mesh with spur gears 187 and 188. The gear 187 is meshed with an intermediary gear 190, mounted upon a shaft 191, while gear 188 is meshed with a gear 192 mounted upon shaft 193. Gear 190 drives a gear 194 mounted upon shaft 155, gear 194 in turn driving an intermediary gear 195 mounted upon shaft 196 the intermediary gear 195 driving a gear 197 mounted upon shaft 134. Gear 192 meshes with and drives a gear 198 mounted upon shaft 183. The gears 197, 194, 187, 188 and 198 are respectively in mesh with gears 200, 201, 202, 203 and 204 for driving the upper feed rolls and the upper sets of metal forming rolls which are mounted on the shafts 154, 164, 173 and 182.

Means are provided to permit vertical movement of the upper sets of feed and form rolls relative to the lower sets of rolls in the event that an imperfect or irregular strip or blank of metal is passing through the rolls. To accomplish this, the blocks 116 and 120 are provided with threaded openings 175, which are aligned respectively with openings arranged in blocks 129 and 130 which sets of openings are each adapted to accommodate a bolt 177. The openings in blocks 129 and 130 communicate with enlarged cylindrical recesses 184 in which are disposed expansive coil springs 185, washers 186 being disposed between the heads of bolts 177 and the springs whereby downwardly acting pressure or force is exerted by the springs 185. In the event that the rolls encounter an irregular or thickened blank the springs 185 will be compressed to permit the blocks 129 and 130 and the rolls carried thereby to move upwardly with respect to blocks 116 and the lower rolls so that no damage will result to the mechanism. The tangs 125, co-operating with the recesses formed on the blocks 129 and 130, prevent lateral disarrangement of the mechanism even though the blocks 129 and 130 are capable of upward movement relative to the lower blocks.

The means supporting the feed and form rolls are adjustable transversely of the machine in order to provide for blanks of different widths for fabricating tubes of different diameters. As has been previously described herein and shown in Figure 5, the bracket 27 is arranged for adjustment transversely of the machine through the manipulation of the threaded member 31 through the application of a crank to the polygonal portion 38 of said member. As the block 116 is secured to the bracket 27 through the medium of securing bolts 118, and as the base portion 121 of block 120 is mounted upon the bracket 27, adjustment of the bracket will move the feed and form roll assemblies in a transverse direction depending upon the direction of rotation of threaded member 31.

The block 120 is also transversely adjustable relative to the bracket 27 whereby the feed and form rolls adjacent the blocks 120 and 130 may be adjusted with respect to the feed and form rolls adjacent the blocks 116 and 129. To this end the bracket 27 is provided with a raised boss portion 207 upon which is mounted a member 208 secured to the bracket 27 by means of screws 209. The upwardly extending portion of member 208 is bored to accommodate a shaft 210, and disposed at either side of member 208 are the collars 211 and 212 surrounding the shaft and secured thereto by means of dowels 214. The outer extremity of shaft 210 is formed with a squared or polygonal shaped portion 216 adapted to receive a crank or other tool for rotating the shaft 210. The opposite end portion of the shaft is threaded as at 217 and projects through a threaded opening formed within a hardened bushing 218, the bushing being fixedly mounted in an opening contained in the block 120. The bushing 218 is formed with a threaded tenon 219, adapted to accommodate a split clamping nut 220. A clamping screw 221 is associated with the clamping nut 220 to secure the latter in adjusted position on the tenon 219 to maintain the bushing 218 in the block 120. The blocks 120, 130 and the form and feed rolls adjacent thereto may be moved toward or away from the feed and form rolls adjacent blocks 116 and 129 by manipulation or rotation of shaft 210, so that the rolls may accommodate different widths of strip material being processed. The form and feed rolls adjacent the blocks 120 and 130 are provided with set screws for securing the same to their respective shafts. The set screws may be released or "backed-off" so that during adjustment of blocks 120 and 130, the form and feed rolls adjacent thereto may slide upon their supporting shafts. After proper adjustment is made the set screws in the feed and form rolls may be drawn up to fixedly secure the rolls to their respective shafts.

Means are provided for securing or locking the bracket 27 and the block 120 in adjusted positions. In the embodiment illustrated these means are independently operable. Arranged within the hollow frame casting 11 in the forward portion thereof is a handwheel 225 which is secured to a vertically disposed shaft 226 by means of a securing pin or dowel 227. The upper portion of the member 226 is threaded into a threaded opening formed in a flanged bushing 229 which is secured to the base plate 23 by means of suitable screws. The upper wall portion 230 of the frame casting 11 is formed with an elongated slot 231 through which extends the shaft 226, the slot providing for transverse movement of base plate 23 and shaft 226 relative to the frame casting 11. The base plate 23 and structure mounted thereon is guided by means of the ways 24 shown in Figure 2. A spacing collar or bushing 233 is disposed between the handwheel 225 and the lower surface of wall portion 230 to provide a suitable hardened wear resisting element between these parts. Thus by manipulating the handwheel 225 the base plate 23 may be securely locked to the frame casting 11 or released therefrom depending upon the direction of rotation of handwheel 225.

The locking means for blocks 120 and 130 is inclusive of a shaft 236 having its upper end threaded into an opening 237 formed in block 120. The lower end of shaft 236 is fixedly secured to a handwheel 238 by means of a pin 239. A spacing collar 240 of hardened metal is disposed between the handwheel 238 and the lower surface of wall portion 230 of frame casting 11. The wall portion 230 is formed with a second elongated slot 241, and the portion 122 of bracket 27 is provided with a similarly shaped elongated slot 242 to accommodate the shaft 236 in its transverse movement. The block 120 may be securely locked to bracket 27, and bracket 27 tightly clamped to the base plate 23 by manipulating the handwheel 238 in the proper direction. If it is desired to move either the bracket 27 or the block 120, or both, it is necessary to release the handwheel 238 in order that the base portion 121 of block 120 may be moved laterally upon the bracket 27. It should be noted that in order to effect transverse adjustment of bracket 27, both locking means must be released through the manipulation of handwheels 225 and 238 in order that the member 31 may be rotated for securing the transverse adjustment.

The frame casting 11 is provided at its front and rear walls with openings to facilitate access to the handwheels 225 and 238. These openings are closed by means of covers or closures 245 and 246. Each of the covers is provided at its lower edge with lugs 248 which take-over the lower edge walls bounding the openings. The closures 245 and 246 are formed with openings to accommodate winged screws 250 which are threaded into suitable openings formed in the base casting 11 above the access openings to secure the covers in closed position. The frame casting 11 is provided with an extension portion 22, providing a support for a means to convey the metal strips or blanks S, after they have been processed through the forming rolls, to a station where the blanks are bent or formed into tubular configurations. Mounted upon portion 22 is a pair of spaced longitudinally extending bars or strips 255 which are secured to raised boss portions 256 of the table portion 22 by means of bolts 257. Each of the members 255 is provided with transverse slots 258 through which the bolts 257 extend so that members 255 may be adjusted transversely to accommodate strips of different widths. Positioning or gaging cleats 260 are engageable with members 255, the cleats being secured to portion 22 by means of screws 261. As shown in Figure 12, the cleats 260 are formed with a plurality of facets so that by releasing screws 261 the cleats may be rotated to bring a different set of facets in a position to be engaged by the bars or strips 255. As the facets are arranged at different distances from the axes of the securing screws, their adjustment determines the relative positions of the bars 255 to accommodate the latter to blanks of different widths. Secured to each of the strips 255 and co-extensive therewith are the guide strips 264, and arranged in engagement with guide strips 264 are supporting ledges or members 265 for supporting the blanks as they are extruded from the feed rolls. The supporting members 265 and the guide strips 264 are secured to the members 255 by means of a plurality of screws 266.

Means are provided for moving the strips S from the form rolls to the bending station. This means is inclusive of a chamber or cylinder 269 equipped with cylinder heads 270 and 271, the head 270 being secured to an end wall of the frame portion 14 while the other end of the cylinder is not secured to a support. The cylinder head 270 is secured to the frame wall portion by means of screws 272. Slidably mounted within the cylinder 269 is a piston 274 and connected to the piston 274 is a piston rod or ram 275 which projects exteriorly of the frame portion 14 through a suitable stuffing or sealing gland (not shown) contained within the cylinder head 270. The cylinder heads 270 and 271 are provided with suitable tubular connections to facilitate the flow of fluid to and from the cylinder 269. While any suitable fluid may be employed for actuating the piston 274, I have found that compressed air is an effective force transmitting medium as it may be rapidly moved into and out of the cylinder, although oil or other fluid may be utilized if desired. The piston rod 275 is threaded at its outer extremity and receives a laterally extending arm 276, which is arranged for limited adjustment along the piston rod 275 and is adapted to be locked in adjusted position by means of securing nuts 277.

Disposed in parallel relation to and co-extensive with piston rod 275, is a member or rod 278 which is fixedly connected to the arm 276 by means of a bolt 279. Suitable supporting means is provided for the member 278 so as to provide for longitudinal movement thereof. The portion 22 of frame member 11 supports brackets 284, 285 and 286. The bracket 284 is formed with a boss portion 287 which is bored to receive a stub shaft 288 upon which is journaled a roller 289 having a concave periphery to engage and support the rod or member 278. The bracket 285 supports a stub shaft 290 upon which is rotatably mounted a roller 291, similar to roller 289, and serving as a support for the member 278. The bracket 286 is formed with a longitudinally extending arm 292, the end portion of which projects through an opening formed in an end wall secured to the frame portion 14, and supports a stub shaft 293 upon which is journaled a roller 294 of the same configuration as roller 291 and serves as additional support for the rod 278.

The rod 278 is formed adjacent one end with a transversely disposed slot 297 within which extends a transversely projecting leg 298 of an L-shaped member 299, the leg portion 298 being fixedly secured in the slot 297 by means of rivets 300. Pivotly mounted upon the lower portion of member 299, upon a pivot shaft 301, is an arm 302 formed with a pawl or ledge 303. A contractile spring 304, having its ends respectively secured to member 299 and to arm 302, functions to resiliently urge the arm 302 in a direction to cause the ledge or pawl tooth 303 formed thereon to engage with the metal blanks to be conveyed to the bending station. The extent of pivotal movement of arm 302, under the influence of spring 304 is limited by means of an adjustable abutment 307, which is held in adjusted position by means of a screw 308.

The mechanisms for performing the bending, interlocking the edge portions of the blanks and seam closing operations in the present embodiment are operated from a power source in the form of an electrically energizable motor 311, which is supported by means mounted upon the frame portion 14. As shown in Figure 6, the motor housing is formed with foot portions 312, which are secured by means of bolts 313 to a plate 314. Welded or otherwise secured to plate 314 is a pair of spaced brackets 315 and disposed between the brackets is a member 316 having upwardly extending portions of the member and the brackets 315 being provided with aligned bores adapted to receive pivot shafts 317. The member 316 is secured to a plate 318 by means of suitable securing screws 319. The plate 318 serves as an upper closure for the frame housing 14 as well as a means for supporting the motor 311. Means are provided for adjusting or regulating the position of the motor to regulate the tension on the power transmitting belts 322. To accomplish this the plate 314 is provided with a threaded opening which receives a threaded stud 323, the latter having an internal socket (not shown) adapted to accommodate a tool for adjusting the stud 323 relative to the plate 314. The lower end of the stud engages the upper surface of plate 318 and in this manner the plate 314 may be swung about the axes of shafts 317 to adjust the position of the motor 311. The stud 323 may be locked in its adjusted position by means of nut 324.

The motor shaft 325 supports a multi-grooved pulley or sheave 326 arranged to be driven by shaft 325 through a key 327. The belt arrangement 322 is of the multi-V-type, there being three belts in the embodiment illustrated, the belts engaging in the grooves in the driving pulley 326. The belts 322 take over and engage a comparatively large driven sheave or pulley 330 which is mounted upon shaft 331 and adapted to rotate the shaft through a medium of a key 332. The difference in the diameters of the driving and driven pulleys 326 and 330 provides that the driven pulley rotates at a much lesser speed than that of driving pulley 326. The driven pulley 330 is prevented from endwise movement on shaft 331 by means of a collar 333, which is secured upon the shaft by means of a pin 334. The shaft 331 is journaled in bearings 335 mounted in boss portions 336 and 337 formed on end plates 338 and 339, the latter being secured to the frame portion 14 by suitable screws. Mounted upon the shaft 331 adjacent the boss 337 is a collar 340 secured to the shaft by means of a set screw 341 serving in cooperation with the hub portion of the driven pulley 330 to prevent endwise movement of the shaft. Also mounted upon the shaft 331 and adjacent collar 340 is a driving pinion 342, the latter having a hub portion 343 to accommodate set screws 344 for holding the pinion in secure engagement with the shaft. A key 345 is interposed between the shaft 331 and the pinion to insure a positive drive.

Ssecured to the end plate structure 339 by means of screws 349 is an arm or bracket 350. The terminus 351 of arm 350 is adapted to support a journal box 352 which has boss portion 353 secured to terminus portion 351 by means of screws 354. The journal box 352 contains a bearing bushing 355 which journally supports a shaft 356. Also secured to the end plate 339 is a bracket 357 which is bored to accommodate a bearing bushing 358, the latter forming a second bearing support for the shaft 356. The bracket 357 is fixed to the plate 339 by means of screws 359. The shaft 356 extends through the frame portion or housing 14 and is journaled at the other end in a bearing mounted in a bracket 363 mounted on the wall 338 of frame portion 14. The shaft 356 is carried intermediate its ends in bearings 360 mounted upon spaced vertical struts 361.

As shown in Figure 2, the drive pinion 342 mounted upon shaft 331 is in mesh with a driven spur gear wheel 366, the latter having a hub portion which is interiorly bored to receive the cylindrical portion 367 of a member 368. The member 368 has a projecting portion 369, and the web portion of the gear wheel 366 and projecting portion 369 have aligned openings adapted to receive a shear pin 370, the latter having a reduced section in alignment with the juxtaposed surfaces of wheel 366 and member 368 so that in the event of overload of the mechanism associated with the cam shaft 356 the pin 370 will be sheared or broken and in this manner damage to the machine is prevented.

Suitable single revolution clutch mechanism is contained within a drum-like clutch housing 373 and the mechanism therein includes a member having a projecting cylindrical tenon 374 which is received into a cylindrical interior bore in the member 368. The tenon portion 374 of the clutch mechanism is adapted to be rotated by member 368 through a key 375.

The clutch mechanism contained within housing 373 is inclusive of a member 376 which is adapted to be driven through the clutch mechanism and imparts rotation to the cam shaft 356 by means of a key 377. In the arrangement of my invention an electrically controlled mechanism is provided for actuating the clutch mechanism 373. As shown in Figures 2, 5 and 25, there is secured to the bracket or arm 350 a supporting member 378 upon which is mounted a solenoid mechanism having a stationary field 379, a coil 380 and a vertically movable armature 381. A link 382 is connected at one end with the armature 381 by means of a pin 383, and at its other end to the short arm of a bell crank 384 by means of a pin 385. The bell crank 384 is pivotally supported upon the arm or member 350 by a pivot pin 386. The other arm of the bell crank extends upwardly and is bored midway to accommodate a pin 389. The pin is adapted to receive a collar 390 which is drilled transversely to accommodate a rod 391 which terminates at one end in an eye connected to a contractile coil spring 392, the other end of the spring being anchored as at 393 to the arm 350. A portion of the rod 391 is threaded to accommodate an adjusting nut 395 for regulating the tension of spring 392 which serves to resiliently urge the bell crank 384 in a clockwise direction as viewed in Figure 5. The upper terminus 396 of the long arm formed on the bell crank engages a ledge 397 formed on the clutch member 394, the bell crank forming means for facilitating the operation of the clutch mechanism. The clutch mechanism is of the so-called single revolution over-running roller type of conventional design and will, therefore, not be described in further detail. When the solenoid mechanism actuates the bell crank 384 to move the terminus 396 of an arm thereof out of contact with ledge 397, the clutch mechanism then becomes automatically operative to rotate the cam shaft 356 through one revolution. When the solenoid mechanism controlling the bell crank 384 is de-energized the spring 392 swings the bell crank until the terminus 396 thereof is again moved into the locus of movement of the clutch mechanism so that re-engagement of terminus 396 with the ledge 397 disengages the clutch mechanism.

I have found it desirable in order to provide for smoothness of operation of the cam shaft to incorporate a friction brake mechanism associated with the cam shaft for the purpose, among others, of minimizing the effects of inertia of the parts or elements carried by the cam shaft and thus provide for a more accurate control of moving elements of the machine. To this end there is mounted upon one end of the cam shaft 356 a drum 402 secured thereto by means of a key 403. Substantially encircling the drum 402 are semi-annularly shaped brake shoes 404 and 405. The brake shoe 404 is formed at one end with a pair of spaced lugs or projections 406 and brake shoe 405 is formed with a single projection 407 which extends between the projections 406 on the other shoe. Projections 406 and 407 are bored to accommodate a pin 408 which pivotally connects the brake shoes together. The lower brake shoe 405 is formed with a projecting lug 409 which is bored to accommodate a pin 410 for anchoring the brake mechanism to the bracket 411, the latter being fixedly secured to the arm 350 as shown in Figure 2. The other extremities of the brake shoes 404 and 405 are respectively formed with projecting lugs 412 and 413 which are bored to accommodate a bolt 414. The bolt 414 is provided with a threaded nut 415 and interposed between a washer 416, adjacent nut 415, is an expansive coil spring 417 surrounding the bolt 414. The spring 417 serves to resiliently bias the brake shoes toward one another, the force exerted by the spring being adjustable by manipulation of the nut 415. The drum 402 is preferably perforated with a series of openings 418 to facilitate the movement of air therethrough to effect cooling of the drum 402.

Referring to Figure 2, the member 302 is actuated by the injection of air or other fluid into the cylinder 269, to effect a movement or conveyance of a blank which has been processed through the forming rolls to a station where bending and seaming of the strip or blank to form a tube is to be accomplished. This mechanism is contained within the frame housing portions 12 and 14. With particular reference to Figure 7, the mechanism is arranged to bend or form the blank to a configuration of circular cross section and includes means for interlocking or inter-engaging the pre-configurated edges of the strip, and means for completing the seaming operation whereby the exterior surface of the formed tube is substantially smooth and cylindrical.

As the blank is conveyed from the forming rolls to the bending station it is moved onto plates or members 425 and 426 which form temporary supporting means for the blank until the bending operation is initiated. The plate 425 is mounted upon a supporting member 427 and is backed by a hardened abutment bar 428. The plate 426 is supported upon a member 430 and is backed by a hardened abutment plate 431, the plates being held in position by means of screws 432. Means are provided, carried by the members 427 and 430, for accommodating blanks of different widths. To this end, there is mounted upon members 427 and 430 longitudinally extending bars 433 and 434. Each of the bars 433 and 434 is formed with comparatively short transversely disposed slots 435 through which bolts 436 extend, which bolts are threaded into suitable openings in the members 427 and 430 to secure the bars 433 and 434 thereto. Means are provided for pre-determining different positions of adjustment for the bars 433 and 434 in the form of sets of gage blocks 438 and 439. As will be seen from Figure 12, each of the gage blocks is secured to its supporting bar by means of a single bolt 440 so that upon loosening the bolts 440, the gage blocks 438 and 439 may be rotated to bring different facets thereof into cooperative association with the rear edges of the gage bars 433 and 434 to pre-determine the distance between the gage bars to accommodate blanks of different widths for forming tubes of different diameters. It will be noticed from Figure 12 that each gage block is provided with several facets of different dimension as measured from the axis of bolt 440 so that the positions of bar 433 and 434 are dependent upon and may be changed by shifting the relative positions of the gage blocks 438 and 439 to move a different set of facets into position for backing the bars. The bolts or screws 440 may then be drawn up to hold the gage blocks in adjusted position, and the bolts 436 drawn up to insure against any relative movement of bars 433 and 434. Respectively secured to the bars 433 and 434 are hardened wear resistant plates 442 and 443, which serve as guides to properly and accurately position the blanks for processing.

The plates 425 and 426 and elements associated therewith are movable transversely of the machine for purposes to be hereinafter explained. To facilitate such movement there is secured to the member 427 transversely extending bars 441 which have central tang portions 444 resting in reciprocally shaped recesses formed in bars 445 which are secured to a machine frame 12 by means of screws 446. By this means the supporting plate assemblies are guided in a transverse direction. The supporting member 430 is formed to accommodate transversely extending bars 448 which have projecting portions slidably mounted in transversely extending recesses or ways formed in the upper wall portion of frame 12. By this means the bar 426 and its supporting mechanism are accurately guided for movement in a transverse direction.

Mounted upon each of plates 427 and 448 are brackets 450 which are secured to the relatively slidable members 427 and 430 by means of machine screws 451. Each of the brackets 450 is formed with a pair of spaced projections and disposed between each set of projections is a link 453 pivotally connected to the brackets by means of pivot pins 454. The opposite ends of the links 453 are pivotally connected to the depending extremities of arms 455 by means of pivot pins 456. There is provided a pair of rocker shafts 457 and 458 which are journaled in suitable bearings 459 carried in the end plates 338 and 339 secured to the frame 14. Each of shafts 457 and 458 is adapted to support a set of the arms 455, the arms being fixedly secured to rotate with the shafts by means of keys 460. Also mounted upon shafts 457 and 458 are upwardly projecting arms 463, which are keyed to the shafts by keys 464. The upper portions of arms 463 are bifurcated to receive or accommodate members 465. The furcations of arms 463 and members 465 are provided with aligned portions to receive connecting pins 466. The members 465 are bored and threaded to receive the threaded extremities of rods 467 and 468, the rods being adjustable with respect to the member 465 and arranged to be locked in adjusted position by means of securing nuts 469. As particularly shown in the sectional view, Figure 11, the rod 468 is threaded at its opposite end as at 470 and is received into a threaded opening formed in a block 471, the rod being held in the block by means of a lock nut 472. Secured to opposite side walls of block 471 and extending upwardly is a pair of elements 473 arranged in parallelism which are secured to the block by means of screws 474, the upper extremities of elements 473 being secured to a tie bar 475 by means of screws 476. The inner opposed portions of elements 473 are recessed longitudinally forming ways which slidably fit the reciprocally forming ways which slidably fit the reciprocally shaped edge walls of a block or member 477. The block 477 is provided with a central aperture, through which extends the cam shaft 356. Supported upon the block 471 is a pin 478 upon which is revolubly mounted a cam follower or roller 479 which cooperates with cam contours or surfaces 480 and 481 formed on a cam member 482, the latter surrounding the cam shaft 356. Surrounding the cam shaft 356 is a collar 483 which is adapted to rotate with the cam shaft by means of a key 484, the key being maintained in proper position in the collar by means of a bolt 485. The collar 483 is provided with a series of circumferential slots adapted to receive bolts extending into threaded openings formed in the cam member 482, forming a driving means whereby the cam member will be rotated with the collar 483 and cam shaft 356. The collar 483 and the means for securing same to the cam member 485 are substantially identical with the collar 513' and securing bolts 529 shown in Figure 7. The contour of cam surfaces 480 and 481 is such that they influence movement of the cam follower 479 to move the block 471 longitudinally of the ways or elements 473 and through rod 468, member 465, arms 463, 455 and link 453, the bending plate 426 may be moved transversely of the machine for purposes to be hereinatfer explained.

As the block 471', cam 482' and collar 483' are substantially identical a description of one set of these elements will suffice. The only difference between the cam members 482 and 482' is that the cam contours formed in cam 482' are modified to cause a transverse movement of the bending plate 425 slightly out of synchronism with the movement of bending plate 426 for purposes to be hereinafter explained.

Means are provided to facilitate the formation of the blank S into tubular configuration in the form of an arbor or mandrel about which the tube may be bent or formed. One of the pertinent features is the provision of such a mandrel adapted to move with the tube being formed during the seaming operation and so mounted or supported that the finished tube may be stripped or extruded from the mandrel by automatic means. To this end there is provided an arbor or mandrel 490, preferably in the form of a solid bar of metal, of a length sufficient to accommodate the longest tube which it is desired to form upon my machine. The mandrel 490 is supported at one end by means of clamping blocks 491 and 492, each block being formed with a semi-cylindrical recess to accommodate the end portion of the mandrel. The mandrel is prevented from relative rotation by means of a key 493. The clamping blocks 491 and 492 are secured together by means of screws 494. The upper block 492 is provided with a central vertically disposed bore adapted to snugly receive a tenon 495, formed on the lower end of a rod 496, the tenon 495 being fixedly secured in the block 492 by means of a pin 497. The upper end of the rod is formed with a tenon 498 which is secured by means of a pin 499 to the bight portion of a substantially U-shaped member 500, one leg of which is provided with a pair of spaced upwardly extending parallel bars or ways 501 which are secured to member 500 by means of screws 502. The ways 501 are secured to a tie bar 510 bridging the upper ends of the bars and secured thereto by means of screws 503. Slidably disposed between the ways or bars 501 is a block 504 which is similar in configuration and function to the block 477 shown in Figure 11.

As shown in Figure 4, a bar 507 is welded to fittings 505 which, in turn, are secured to bosses 506 formed on end walls 338 and 339 of the frame portion 14, the bar 507 extending full length of the frame member 14. The bar 507 serves as a reinforcing means for the frame of the machine, and at the same time provides an arrangement for guiding relatively movable elements of the mechanism. The bar 507 is bored to receive a bearing bushing 508 which serves as a guide for the rod 496.

Mounted upon the cam shaft 356 is a cam member 512 which is secured to a collar 513 of a construction similar to the collar 513' shown in Figure 7, and a similar means is utilized for driving the cam 512 through the medium of collar 513 and associated mechanism from the cam shaft 356. Adjustment is provided between cam 512 and collar 513 of the same nature as the adjustment provided for between cam member 482 and collar 483.

The leg portions of the U-shaped member 500 are provided with aligned openings adapted to receive a stub shaft 514 upon which is journaled a roller or cam follower 515 the latter being arranged to engage the exterior surface or cam contour 516 formed on cam member 512. One leg of the U-shaped member 500 is provided with a pin 517 having a projecting portion upon which is journaled a second cam follower or roller 518 which is arranged for cooperation with an interior cam surface 519 formed on the cam member 512. The cam contours 516 and 519 are of a configuration suitable to move the U-shaped member 500, shaft 496 and arbor 490 in a vertical direction through the medium of the cam rollers 515 and 518.

An abutment means, which is also cam actuated, is provided for engagement with the other end of mandrel 490 when pressures are exerted upon the blank being formed or bent around the mandrel 490. To this end there is disposed above the terminus portion of mandrel 490 an abutment block 522 which has a curved or arcuate lower surface arranged for cooperative engagement with the cylindrical periphery of mandrel 490. The block or abutment 522 is secured to a rod 523 by means of a pin 524, the upper end of rod 523 being connected by means of a pin 525 to a U-shaped member 526 of the same configuration as U-shaped member 500. The U-shaped member 526 is also provided with a pair of upwardly extending parallel elements or ways 501', which are connected together by a tie bar 502'. A cam member 527 is connected to the cam shaft through the medium of a collar 513' shown in Figure 7 and of similar construction to collar 513. The cam member 527 is adjustably connected to the collar 513' to be driven by cam shaft 356 through an arrangement of circumferential slots 528, adapted to accommodate bolts 529 for securing collar 513' to the cam member 526, as particularly shown in Figure 7. A reliable adjusting means is thus provided between the cam 527 and collar 513' wherein the cam 527 is provided with a projecting pin 530 and the collar 513' formed with an arcuate slot 531, adapted to accommodate the pin 530. The collar is also provided with threaded openings arranged to receive adjusting screws 532 and 533 engageable with the pin 530 so that by manipulating the screws 532 and 533 a positive means is provided for regulating the relative position of cam member 526 with respect to the collar 513'. The collars 483, 483', 513 and 565 are of substantially the same construction as collar 513' and adjustment of the cams associated therewith is obtained in the same manner.

The cam 527 is provided with exterior and interior cam surfaces 536 and 537 respectively which cooperate with cam followers or rollers 538 and 539 carried by the U-shaped member 526. The cam member 527 is of slightly different shape than that of cam member 512 for the purpose of initially moving the abutment block 522 into operative engagement with mandrel 490, during forming and bending operations.

It should be noted that there is no fixed connection between the abutment block 522 and the end portion of the mandrel 490. This is to facilitate the stripping of finished tubes from the mandrel. To accomplish this the inner cam surface 537 of cam member 526 is formed with a land or lobe 540 which, when in the position shown in Figure 7, raises the abutment block above and out of contact with the mandrel 490, as shown in Figure 4. The initial rotation of cam member 526 from the position shown will move the rod 523 and abutment block 522 downwardly so as to provide adequate backing or a buttress for the mandrel during bending operations of a blank. The reinforcing bar 507 is bored to snugly receive a bushing 542 through which the rod 523 extends, the bushing serving to guide the rod 523 and maintain the same in a vertical position during its reciprocatory movements.

Cam actuated means are provided for effecting seaming operations in forming the tubes. The completion of the tube seaming operation is effected through the medium of a hammer or striker plate 545, shown in Figures 4 and 7, which is in the form of a longitudinal bar, co-extensively arranged with the mandrel 490. The bar 545 is preferably formed of hardened steel or the like, and is mounted in a carrier or holder 546, being retained therein by a plurality of set screws 547. The holder 546 is co-extensively arranged full length for the striker plate 545 so as to provide adequate support for the latter. The striker plate holder 546 is suspended from a pair of rods 550, each of which is formed with a tenon portion 551, extending into suitable openings in the holder 546, the tenon of each rod being secured in the holder by means of pins 552. The upper end of each rod is provided with a tenon portion 553 which is secured to U-shaped members 554 by means of a pin 555. The members 554 are of the same general construction as U-shaped member 500. Secured to one leg of each of the members 554 is a pair of upwardly extending spaced bars 558 which are secured to a transversely extending tie bar 559. The members 558 form ways between which is disposed a slide block of the same general character as slide block 477, shown in Figure 11. Mounted upon the cam shaft 356 and disposed adjacent each of the pairs of members 558 is a cam 560, having outer and inner cam surfaces designated 561 and 562 respectively.

Journaled upon a shaft carried by each U-shaped member 554 is a cam roller or follower 563 which cooperates with the exterior cam surface 561 on the cam while a second roller or cam follower 564 cooperates with the inner cam contour or surface 562. Each of the cams 560 is driven from the cam shaft 356 through the medium of collars 565. The contours of the cams 560 are such as to reciprocate the rods 550, holder 546 and striker plate 545 in a vertical direction to effect the completion of the seaming operation on sheet metal blanks being processed. Each of the connecting rods 550 projects through suitable guide bushings 566, mounted in the stationary reinforcing bar 507. By this means vertical movement of the striker plate 545 is assured.

Disposed below the mandrel 490 is a vertically movable member 570, which is formed with a recess arranged in parallelism with the mandrel, and in which is mounted an anvil 571 secured to its supporting member 570 by means of screws 572. The member 570 in cross section is generally the shape of a Greek cross as shown in Figure 7. The laterally projecting portions 573 and 574 are each provided adjacent their end portions with openings adapted to snugly receive guide bushings 575, each guide bushing being centrally bored to slidably accommodate guide rods 576, the latter being pressed into aligned openings in boss portions 577 and plates 578 and 579. The plates 578 and 579 are spaced apart, as shown in Figure 7, and are supported upon laterally arrranged projections or ledges 580 and 581 integrally formed upon a central reinforcing web 582, the latter being cast or formed as an integral part of the frame portion 12 of the machine. Four rods 576 are provided to guide the movement of member 570, two rods being supported by each of plates 578 and 579. Each of the ledge portions 580 and 581 is provided with a pair of depending extensions 585, which are bored to accommodate coil springs 586, an abutment in the form of a member 587 being threaded into the lower end of the opening formed in each of ledges 585 to position the springs in the recesses contained in the ledges. The springs extend upwardly through suitable openings formed in plates 578 and 579 and engage against the lower faces of projections 573 and 574, thus serving to normally maintain member 570 in its uppermost position, as shown in Figure 7. The abutment members 587 are centrally bored and threaded to accommodate the threaded portion of bolts or rods 588, each of which is formed with a head portion 589. The ledges 573 and 574 are each provided with a pair of openings through which the rods 588 extend, the head portions 589 thereof contacting the upper surfaces of the ledge portions 573 and 574. A nut 590 is threaded upon the lower ends of each of the rods 588 and may be adjusted to predetermine the uppermost extent of movement or position of the member 570. The lower end portion of each of rods 588 terminates in a squared or polygonal portion 591, adapted to receive a suitable tool to prevent rotation of the rods while the nuts 590 are adjusted to determine the relative position of the member 570. In the embodiment illustrated I have employed four springs 586 arranged in pairs on either side of longitudinal center of member 570.

The depending central portion of member 570 is fitted with a pair of spaced hardened metal plates 594 secured to member 570 by means of screws 595. The plates 594 are adapted to engage abutment means to determine the lowermost position of movement of member 570. The abutment means employed is of an adjustable nature and is inclusive of a bed plate 596 which is slidably supported upon a uniplanar upper surface 597 of the web 582, the plate 596 being disposed between and beneath the bars 578 and 579. The web portion 582 is provided with a threaded opening 598 which is adapted to receive a bolt 593 for securing the bed plate 596 in adjusted position. In the embodiment illustrated the plate 596 is arranged to be adjusted to three different positions and to this end the plate is provided with three spaced openings 599, 600 and 601. A vertically extending handle portion 602 is provided for moving the bed plate 596 longitudinally. To change the position of plate 596 the bolt 593 is first removed, after which the operator grasps the handle 602 and shifts the plate until one of the other openings 599 or 600 is in registration with opening 598 in the web 582, and by reinsertion of bolt 593 into opening 598 the plate 596 may be retained in one of its other positions.

Mounted upon the bed plate 596 is a pair of members 603, each of which is formed with a series of lands or stop portions arranged in echelon. As illustrated, three lands of different heights, designated by numbers 604, 605 and 606, are provided as stop means. Each of the plates 603 is secured by means of plurality of screws 607 to the bed plate 596. As illustrated in Figures 4 and 7 the downward movement of member 570 is limited by engagement of plates 594 with one set of lands formed on members 603. By adjusting the relative position of bed plate 596 in the manner hereinbefore explained, the position of abutment plates 603 may be shifted to change the amount of downward movement of member 570, by causing the plates 594 to engage a different set of lands formed on plates 603.

Means are provided, associated with the rod or ram 278, for ejecting or extruding finished tubes from the mandrel 490. Secured to the reinforcing bar and support 507 is a pair of spaced brackets 610, held in place by means of screws 611, the brackets having horizontal or ledge portions 612. Secured to the ledge portions 612 by means of screws 613 is a longitudinally extending bar 614. Spaced from bar 614 is a second bar 615, and disposed between the bars are spacing blocks 616, arranged near the ends of the bar 614, there being interposed an additional intermediate spacing member 618, as shown in Figure 13. Positioned between the bars 614 and 615, and adjacent end portions thereof, is a pair of members 619, each member 619 being adjustable longitudinally of the bar in the space provided between the end block 616 and an extremity of the spacing bar 618. Each of members 619 is provided with a pair of threaded openings adapted to receive bolts 620 for adjusting the lengthwise position of each of said members 619. The bar 614 is provided near each end portion with pairs of slots 621, through which the bolts 620 extend, a plate 622 being disposed between the bar 614 and the heads of the bolts 620, as particularly illustrated in Figure 14. The provision of slots 621 in bar 614 permits a limited amount of endwise adjustment of each of members 619.

Each of member 619 is provided with a rectangular recess 623, within which is slidably disposed a block 626. Each block 626 is resiliently urged in one direction under the influence of an expansive coil spring 627, part of which is disposed within a tubular recess 628 formed in the block. Each block 626 is bored to snugly accommodate a pin or member 629, which extends laterally from block 626.

A construction similar to the above, including a slide block 626' and pin 629', is disposed adjacent the other end zone of bars 614 and 615. The purpose of the pins 629 and 629' is to control the relative lateral position of the tube extruding or ejecting means.

The end of the ram or rod 278 is bored to snugly receive the extremity of a threaded stud 631 extending into a member 632, which is reduced in cross section to accommodate a second member 633, the said members 632 and 633 being secured together by means of screws 634. The stud 631 is locked in proper position in member 632 by means of a securing nut 630. The members 632 and 633 together form a rectangular configuration in cross section, as especially shown in Figure 14, and as a unit, is slidable in suitable recesses formed in members 614 and 615. The member 632 is transversely bored to snugly receive a pin 635, upon which is pivoted a member 636, as shown in Figure 13. The member 633 is formed with ledge portions 637 which cooperate with a projection 638 formed on member 636 to limit the extent of pivotal movement of the member 636 about the pintle 635. The laterally extending arm of member 636 is bored to accommodate a pin 639, which is arranged for engagement with the pins 629 and 629' carried by the blocks 626 and 626'. The other arm 640 of member 636 is provided with a slot 641 through which extends a pin 642, the latter also extending into suitable openings formed in a plunger 643. The plunger 643 is configurated with a recess 644 to accommodate the portion 640 of member 636. The plunger 643 is laterally movable in a recess 645, the walls of the recess serving to properly guide the plunger 643. Disposed in slot 641, formed in portion 640, is a bearing member 646, which has a concave surface for engagement with pin 642, and an opposed flat surface adapted to be engaged by an expansive spring 648, disposed in the slot 641. The spring 648 serve to resiliently maintain the plunger 643 in either of its two positions to accomplish functions hereinafter explained. The plunger 643 has a depending arm 651 which is provided at its lower end with a bore adapted to accommodate a tube ejecting finger or member 652, the latter being adjustably mounted in the depending arm 651 and held in adjusted position by means of a securing screw 654. By means of the foregoing described arrangement, the finger 652 may be moved into a position to engage the end of a finished tube for the purpose of extruding same from the mandrel 490, the parts supporting the finger being shown in tube extruding position in Figures 7 and 13. When the rod 278 moves in a right hand direction, as viewed in Figure 13, to extrude the finished tube from the mandrel, the pin 629' is engaged by pin 639 to shift the position of the plunger 643, thus withdrawing the finger 652 away from the mandrel 490 in order that the finger and its associated mechanism may be retracted from tube extruding position without engaging the flat blank which has been moved adjacent the mandrel 490 during the tube extruding operation.

As shown in Figure 7, an oiling device 656 is provided for conveying lubricant to the surface of bars 614 and 615, which are traversed by the members 632 and 633. An oiling device 657 is also provided to lubricate the surfaces of member 443 which are slidable with respect to the frame portion 14.

Figure 22 illustrates in diagrammatic form the electrical circuits and fluid controlling devices for actuating various components of the mechanism. For actuating certain mechanisms, I preferably utilize air under pressure but it is to be understood that other fluid or liquid may be used without departing from the spirit of the invention. The compressed air is obtained from any suitable source (not shown), and is conveyed by means of a tube or pipe 661 to a tube 662, the latter being in communication with a pressure reducing valve 663, the low pressure side of the valve being in communication with one end of cylinder 95 by means of a tube 664. Pipe 661 also is in communication with a pipe 665, which leads to a control valve 666, which is operated by means of a solenoid 667.

The air valve 666 is in communication with one end of a cylinder 269 by means of a tube 668. The cylinder 269 contains a piston 274 for actuating the rods 275 and 278. The other end of the cylinder 269 is in communication with the air valve mechanism 666 by means of a tube 669.

As shown in Figure 5, mounted upon the rod 278 is a cam or raised portion 670 secured to the bar by means of screws 671 and which is adapted to cooperate with a roller 672, which is carried upon the extremity of a plunger, forming a part of an air control valve 673. As shown in Figure 22, the air valve 673 is in communication with tube 669 by means of a tube or pipe 674'. The air valve 673' is also in communication with the other end of the cylinder 95 by means of an air tube 675. The cylinder 95 actuates the blank conveying table for moving the blank into the metal forming rolls. The air valve 666 may be placed in any convenient position in the air line.

The operations of several of the mechanism are controlled and actuated by electrical means, the circuits of which are shown in Figure 22. The circuits are inclusive of a three wire current supply, the individual lines being designated 678, 679 and 680. The line 678 is connected by means of circuit 681 with a three-station manually operated control switch 682. This switch controls a manual start and stop arrangement for the motors 43 and 311 and an emergency stop for other electrically actuated mechanisms. A starting switch 685 is provided in the circuit for the motor 43 while a starting switch 686 is provided for the circuit of the motor 311.

Mounted upon the frame of the conveyor table 59 is a circuit interrupter or switch 687 having a plunger 688 normally resilient urged to an uppermost position. Whenever the operator places a blank upon the conveyor table 59, the weight of the blank depresses the plunger 688 to close the circuit through the circuit interrupter 687 as shown in Figure 22. The circuit interrupter 687 is a master control which prevents the operation of any of the other mechanisms until a blank is placed upon the interrupter to close the same. One side of the interrupter is connected by means of a wire 689 to a switch 690, shown in Figure 4, which is intercalated with switch 687 to prevent operation of blank feeding in the event that the seam closing hammer 545 is not in its proper initial position. A wire 693 connects the manually operated switch 682 with a contact in the switch 690 to complete the circuit therethrough. On contact of the switch 690 is connected by means of a wire 694 with one contact of an addition safety switch 695. The switch 695, as particularly shown in Figure 7, includes a vertically disposed plunger or finger 696 which interrupts the circuit in the event that a finished tube has not been stripped from the mandrel 490 when it is in its upper-most normal position shown in Figure 7. Another contact in the safety switch 695 is connected by means of a wire 699 to one contact of a switch 700 which is shown in Figure 4. The switch 700 is formed with a movable plunger 701 which engages an upwardly extending arm of a bell crank 702 which is pivoted for oscillation about a pin 703 mounted upon a bracket 704 secured to the exterior wall of frame casting 14. The other arm 705 of bell crank 702 is formed at its extremity with depending projections 706 between which is mounted a roller 707, the latter being journaled upon a pin 708 carried by projections 706. The arrangement just described is a safety switch means to prevent operation of the machine in the event that a finished tube is only partially ejected from the mandrel 490. As long as a tube is in engagement with the roller 707, the switch 700 is in "open circuit" position to prevent further operation of the mechanism. The switches 690, 695 and 700 are of the so-called micro-switch type, the switch 690 being normally open while switches 695 and 700 are normally in closed circuit position and are adapted to be moved to open position in case of abnormal conditions occurring during the cycle of operations in forming the tubes.

The finished tubes, when extruded from the mandrel 490, are deposited upon a ramp 709 carried on the frame portion 12 by a wire-like support 710 arranged at the upper-most end portion of the ramp 709.

A double throwswitch 712 is provided for controlling the circuit for energizing and de-energizing the solenoid 380 for actuating the clutch 373, and for controlling the energization of the solenoid 667 for actuating the air control valve 666. The switch mechanism 712 is illustrated in Figure 2, the housing supporting mechanism being carried by a bracket 713 which is secured to the frame housing 14 by means of screws 714. The transverse bar 276 connecting the rods 275 and 278 is provided with a clip or cam 715 formed with an upwardly and diagonally arranged portion adapted to engage a roller 716 carried by the switch plunger 718 which operates the switch mechanism 712. The contacts 719 of switch 712 are in circuit with a holding relay 720 for causing energization of solenoid 380 to actuate the clutch. Simultaneously with the energization of of the clutch, the contacts 721 of switch 712 are opened to disconnect the circuit through the holding relay 722 to de-energize the solenoid 667 whereby the air valve mechanism 666 under the influence of spring 723 moves the air valve to a position where air under pressure is introduced in the cylinder 269 through the tube 668 to drive the piston 274 in the opposite direction. The movement of piston 274 carries the rods 275 and 278 to their initial outer-most position whereby a succeeding blank, having pre-formed edges leaving the forming rolls may be moved to the bending station.

The apparatus of my invention is particularly useable for forming tubular members employed as internal components of muffler assemblies for use with internal combustion engine exhaust systems. In forming such components the sheets of metal or blanks used in fabricating the tubes may, in some instances be perforated with a plurality of small openings to permit passage of exhaust gases while in other instances the blanks are imperforate. In the arrangement of my invention, tubes may be readily formed with either perforate or imperforate blanks. In the operation of the machine the operator first causes the electric motors 43 and 311 to become energized by manipulating "motor start" button to close the switch arm 726 shown in circuit diagram, Figure 22. While any fluid may be employed in the fluid circuits forming a part of the actuating mechanism for the machine, I have found that compressed air serves very satisfactorily in the fluid system. The tube 661 is connected to a suitable source of air under pressure for actuating the pistons 97 and 274. The operator then places a metal strip or blank upon the table 59, the plates 60 and 61 of the table directly supporting the blank. The gage strips 74 and 75 are adjusted by manipulation of the screws 78 so that the blank is disposed between the gage strips to permit the blank to be moved lengthwise along the plates 60 and 61. The blank being in engagement with the plunger 688 of switch 687 depresses the plunger and closes a circuit to permit the several automatic operations of conveying and processing the blanks to proceed. Assuming that the micro or safety switches 690, 695 and 700 are in closed position, a condition which exists when no abnormal situation is encountered, the solenoid winding 667 is energized, as the holding relay 722 is energized through the switch 687 to complete the circuit through the solenoid 667. The energization of the latter moves the plunger or air valve 727 to its extreme right-hand position, as viewed in Figure 22, to establish communication between the air under pressure in the conduit 661 with tubes 669 and 674, the latter leading to air valve 673. As the pressure in conduit 669 rises the piston 274 in cylinder 269 is moved in a right-hand direction as viewed in Figure 22. This action moves the rods 275 and 278 to the right as viewed in Figure 2, which causes the cam or lobe 670 to contact the roller 672 carrier by the plunger to open the air valve 673 and permit the flow of air under pressure through the duct or tube 675 to the left-hand end of cylinder 95, as viewed in Figure 22. This action moves the piston 97 in a right-hand direction. The air line 662 is provided with an air pressure reducing valve 663 so that at all times a comparatively low pressure is existent in the right-hand end of the cylinder 95. When the air valve 673 is actuated by the cam 670, the full high pressure of the line is conducted through tube 675 to the left-hand end of the cylinder 95, and due to the differential in pressure existent on opposite sides of piston 97 the latter will be moved in a right-hand direction. As the piston rod 98 connected to the piston 97 is also connected by means of a bracket 92 with the longitudinally extending bar or ram 83 carrying the abutment or stop member 84, the ram 83 is moved longitudinally by the piston 97 and the abutment 84 is caused to engage the rear edge of the blank to move the latter along the plates 60 and 61 over the guide roller 112 and between the feed rolls 131 and 132.

The feed rolls 131 and 132, being driven through gearing from shaft 50 driven by the motor 43, carry the blank into the forming rolls, shown in Figures 8 and 9. As the several sets of feed rolls are driven through gearing, shown in Figure 8, the blank passes progressively through the several sets of forming rolls. The blank upon leaving the last set of forming rolls, has its edge portions configurated to the shape illustrated in Figure 19. During the passage of the blank through the forming rolls the rods 275 and 278 are being moved in a right-hand direction, as viewed in Figures 2 and 22. During this movement the elongated cam 670 passes beyond the roller 672 to permit the valve 673 to return to its normal position, cutting off the supply of air under pressure to the left-hand end of cylinder 95 and venting the line 675 through the valve to the atmosphere to release the pressure in the left-hand end of cylinder 95. With the pressure released in this end of the cylinder, the comparatively low pressure on the right side of piston 97 in the cylinder 95 will force the piston 97 in a left-hand direction to return the ram 83 and abutment 84 to their initial position shown in Figure 2, and in readiness to receive additional metal blanks for processing.

When the rods 275 and 278 reach the extreme limit of movement in a right-hand direction, as shown in Figure 2, the cam or clip 715 engages roller 716 on switch plunger 718 of the switch 712 actuating the movable contact of the switch to close the circuit through solenoid switch 720 closing said switch and energizing the solenoid 380 to actuate the clutch 373 to initiate the bending operations. As a further effect of operation of switch 712 the solenoid 667 of the air valve is de-energized through the de-energization of the holding relay 722, moving the air valve 666 to direct air under pressure from the valve through the air line 668 to the right-hand end of cylinder 269, which pressure drives the piston 274 and hence rods 275 and 278 in a left-hand direction. The air valve 666 is arranged to vent the line 669 to relieve pressure in the left hand end of cylinder 269. The bracket 299 carried by rod 278 pivotally supports the pawl 302. As the pawl moves in a left-hand direction, the end thereof rides upon the upper surface of the blank which is in the operation of being extruded from the forming rolls. When the pawl 302 reaches its maximum movement in a left-hand direction, viz., the position shown in Figure 2, the ledge or tooth 303 of the pawl is moved to its lowermost position under the influence of spring 304. When the air valve solenoid 667 is again energized, the line 668 is vented to the atmosphere and air pressure will be directed through line 669 to the left-hand end of cylinder 269 causing the piston 274 to again move in a right hand direction. During this movement the ledge 303 of the pawl 302 engages the blank having preformed edges and moves the latter along the guide and supporting bars 255, thus conveying the blank on to the plates 425 and 426 shown in Figure 7, the blank being properly centered by means of the gage blocks 442 and 443. When the blank has been moved to such position it is disposed beneath the mandrel 490, designated herein as the bending station.

When the blank has been moved to the bending station, that is to a position beneath the mandrel 490, the switch 712 is again actuated by means of the clip or cam 715 which closes a circuit through the relay 720 to energize the clutch actuating solenoid 380. The actuation of the solenoid 380 shown in Figure 5, draws the armature 381 of the solenoid mechanism downwardly, oscillating the bell crank 384 about its pivotal shaft 386, to withdraw the extremity 396 of one of the arms of the bell crank out of engagement with the ledge 397 of clutch mechanism. This initiates the immediate operation of the over-run clutch mechanism contained in the clutch housing 373 to cause rotation of the cam shaft 356. The driving portion of the clutch 383 is continuously rotated through the gears 366 and 342 from the shaft 331, the latter being rotated by pulley 336 driven by belts 322 from motor 311. The clutch is of a so-called single revolution type so that during each cycle of operation of the mechanism, the cam shaft 356 will be rotated through only a single revolution. During the first portion of a revolution of the cam shaft 356 the mandrel 490 is moved downwardly under the influence of cams 512 and 537 cooperating respectively with roller 515 and 538. The cam contour of cam 512 is such that for a few degrees of rotation of cam shaft 356 it does not move the mandrel 490. The cam contour of cam 537 is such that during the first few degrees of rotation of the cam shaft, the rod 523 and the abutment block 522 is moved downwardly to bring the abutment block into direct engagement with the free extremity of mandrel 490. When this action takes place, both ends of the mandrel will be provided with an upper support during the remainder of the movement of the mandrel on its down stroke. The contours of cam 512 and 537 are configurated to thereafter move the mandrel 490 downwardly until the lower portion of the mandrel engages the upper surface of the blank S, the lower central portion of which is supported upon the anvil 571 carried by the movable support 570. The blank is thus held between the mandrel 490 and the anvil 571. The mandrel is then further moved downwardly under the influence of the contour of the cams 512 and 537 depressing the resiliently mounted support 570 so that the portions of the blank lying adacent the upper surfaces of plates 425 and 426 are bent upwardly as such portions pass the edges of these plates. After the mandrel and the blank disposed thereon are carried between the plates 425 and 426, the cams 482 and 482' actuate the rods 468 and 467 respectively to move the plates 425 and 426 inwardly in order to join the juxtaposed preconfigurated edge portions of the blank. The cam 482' which controls the lateral movement of the plate 425 moves inwardly slightly in advance of the movement of the plate 426. This is for the purpose of positioning one pre-configurated edge so that when the other pre-configurated edge portion of a blank is moved under the influence of the plate 426 actuated by cam 482, the latter edge conflugration will snap under its adjacent and opposite edge configuration to provide an initial interlock of the adjacent portions of the blank to form substantially cylindrical or tubular configurations to the blank. This initial interlocking position of the edge portions of the blank is illustraed in Figure 20. Plates 425 and 426 are then backed away by cams 482 and 482' to permit the inherent stress in the blank to secure the overlapping portions in close engagement so that when the overlapped portions are engaged by the striking hammer, a closed, tight interlock seam will be formed. During the preceding operations, the cams 560 and 562 are engaged in moving the bar 546 carrying the seaming or striking hammer 545 downwardly but not in engagement with the blank. After the initial interlock of the edge portions of the blank, the cams 512 and 537 have then moved the resiliently mounted support 570 downwardly until the plate 594 carried by the support engages one of the sets of abutment or movement limiting stops carried by the bar 603. After the mandrel has been moved to this position in which the blank is bottomed upon the anvil 571 carried by the support 570, the cams 560 and 561 are contoured to then bring the hammer or striker 545 into forcible engagement with the interlocked and overlapping portions of the blank to complete the formation of the seam in the blank and thus complete the tube. As will be seen from Figure 7, the upper portion of the mandrel 490 is provided with a longitudinally extending recess 509 into which the metal of the overlapping portions of the seam is projected under the influence of the striker plate 545. By this means the exterior surface of the finished tube is smooth and of substantially circular configuration in cross section as shown in Figure 21. If desired, the recess 509 may be dispensed with and the interior of the tube rendered smooth with the seam projecting exteriorly of the tube. Means are provided to prevent longitudinal shifting of the overlapping portions of metal forming the seam. In the embodiment particularly illustrated in Figures 4 and 26, the striking hammer 545 is formed with a series of spaced bores in which are pressed a plurality of pins 548 having rounded or pointed ends 549. When the hammer 545 strikes the overlapping portions to "set" the seam, the rounded or pointed ends 549 are projected into the overlapping portions providing interlocking indentations and projections spaced along the seam.

After the seam has been "set" by the striker plate 545, the cams controlling the striker plate 545, the mandrel 490 and the bending plates 425 and 426 complete their cycle of operation and move the parts to their initial or starting position as shown in Figure 7.

During the preceding operations the piston 274 in cylinder 269 is moving from its extreme righthand position as viewed in Figure 22 to the lefthand position, thus moving the rods 275 and 278 away from the housing 14 and carrying with them the mechanism associated therewith. One of the mechanism carried carried by rod 278 is the tube extruding means. This means includes the finger 652 carried in the lower end of member 651 which is retracted to an out-of-use position during the operations of bending and seaming the blank to form a tube. The finger 652 is moved out of the path of the tube by means of a construction of the character shown in Figure 13 but which is associated with the opposite ends of the bars 614 and 615. Thus by means of a stop pin 629' of the same construction as pin 629 in Figure 13, the pivoted member 636 is moved laterally to retract the plunger 643 in a direction away from the mandrel. In this manner the finger 652 is moved parallel with the mandrel during the final tube forming operations but is out-of-engagement with the mandrel. When the mechanism connected to the bar 278 reaches the position shown in Figure 13, the abutment 639 on pivoted member 636 strikes the pin 629. This engagement causes pivotal movement of member 636, and under the influence of the toggle action of spring 648, the plunger 643 is moved toward the mandrel 490, thus bringing the finger 652 into a position to directly engage the end of the tube surrounding the mandrel 490 which has just been completed by the machine.

Upon the succeeding movement of the piston 274 and rods 275 and 278 in a right-hand direction, as viewed in Figure 2, an unprocessed blank is moved into the feed rollers 131 and 132; the blank that has just been extruded from the forming rolls is being conveyed by the pawl tooth 363 into position above the mandrel 490 and temporarily supported upon the plates 425 and 426; while the finished tube surrounding the mandrel 490 is being extruded therefrom under the influence of the finger 652. Thus during one complete cycle three different blanks are in the machine, one entering the forming rolls, one being conveyed from the forming rolls to the bending station, and the finished tube being extruded from the mandrel. By this arrangement and method of processing, a finished tube is delivered by the machine at the end of each complete cycle of operations and a high production rate of manufacturing the tubes is attained.

As has been previously mentioned, there are several safety or micro switches intercalated in the electrical circuits to insure against damage which might be caused by the introduction of an irregular or distorted blank into the machine or upon the failure of any unit of the mechanism to properly complete its function. The switch 690, shown in Figures 4 and 22, is arranged to be engaged by a pin 724 projecting from the striker plate holder 546, so that when the striker plate is in its upper-most position, the contacts through switch 690 will be closed. The pin or plunger 696 depending from switch 695 is arranged to prevent the conveyance of a blank onto the mandrel 490 when a tube is already disposed upon the mandrel. Thus if for any reason a finished tube is not properly stripped from the mandrel the cycle of operations will cease by reason of the open contacts in the switch 695. The safety switch 700, as shown in Figure 4, is arranged adjacent the free end of the mandrel 490. In the event that a finished tube is not completely ejected from the mandrel, the tube engages the roller 707 swinging the arm 705 to a position to act on switch plunger 701 and open the circuit through this switch. Thus by the employment of these safety switches damage to the units of the machine is prevented, as the functioning of the machine will be stopped until the abnormal situation is corrected.

It will be apparent that the operation of forming seamed tubes is completely automatic. The cycle of operations will proceed whenever the operator places a blank upon the table 59 which act closes the switch 687, energizing the proper circuits and electrical controls in the manner explained herein.

As shown in Figure 22, the manual switch mechanism 682 is also provided with a switch unit 673 manually actuated to permit the machine operator to stop the cycle of operations at will. A switch unit 674 is also provided whereby the operator can manually break the circuit to stop the operations of the motors 43 and 686.

The machine of my invention may be utilized to form tubes of various diameters by adjusting the relative positions of the blank feeding and forming rolls and employing mandrels 490 of the proper diameters for different sizes of tubes.

It is apparent that, within the scope of the invention modifications and different arrangements may be made other than is herein disclosed, and the present disclosure is illustrative merely, the invention comprehending all variations thereof.

What I claim is:

1. Mechanism of the character disclosed, in combination, a frame; a support for a blank; a plurality of forming rolls; means for feeding a blank from said support into said forming rolls; a horizontally disposed mandrel; means for positioning a blank from said forming rolls adjacent said mandrel; fluid actuated means for operating said blank feeding means; electrical means for initiating the operation of said fluid actuated means; cam actuated means for reciprocating said mandrel in a vertical direction to form said blank to U-shaped configuration; instrumentalities including laterally movable elements associated with said mandrel for bending the U-shaped blank into a tube; means for rotating said forming rolls and actuating said instrumentalities; means including a circuit closing device operable by the presence of a blank on said support for initiating the operation of the blank feeding means and the operation of the bending instrumentalities, and means in the circuit of said electrical means for interrupting the operation of said blank feeding means upon failure of the instrumentalities to perform their normal functions.

2. A tube forming machine including, a frame, a support for sheet metal blanks; means for preforming edge portions of the blanks; a mandrel; fluid actuated means for feeding the sheet metal blanks into the edge forming means; means for conveying blanks from the edge forming means to a position adjacent the mandrel; said conveying means including a member movable longitudinally of said mandrel; fluid actuated means for operating said member; said blank conveying means including a relatively movable pawl carried by said member and engageable with a blank for moving same from the forming rolls to the mandrel; a shaft; cam means associated with said shaft; mechanism actuated by said cam means for moving the mandrel downwardly to form the blank to U-shaped configuration; cam actuated means engageable with the U-shaped blank for forming the said blank to a tube; a cam actuated hammer for lock seaming adjacent overlapping portions of the blank; means associated with said member and engageable with the completed tube for ejecting the latter from the mandrel; electrically energized means for controlling the operation of said member and said cam means, and a circuit interrupter intercalated in the circuit of said electrically energized means and dependent upon the presence of a blank on said support for initiating the operation of the several means for performing operations upon the blank to form a finished tube.

3. In a device of the character disclosed, in combination, a frame; a sheet metal blank receiving and supporting means associated with the frame; means for adjusting said blank supporting means to accommodate blanks of different widths a plurality of forming rolls mounted on said frame adjacent the blank supporting means; means for adjusting the relative positions of said forming rolls to accommodate blanks of different widths; means for rotating said feed rolls; fluid actuated means for moving a blank from the supporting means into the forming rolls; a mandrel; fluid actuated means for moving a blank ejected from said feed rolls into a position adjacent the mandrel; relatively movable plates arranged adjacent said mandrel, means for moving said mandrel and blank relative to said plates for forming the blank to a U-shaped configuration; said plates being arranged for lateral movement into engagement with the blank disposed adjacent said mandrel whereby overlapping portions of said blank are moved into interlocking relationship; means including a bar co-extensively disposed with respect to said mandrel and arranged for simultaneous engagement throughout the length of the blank with the overlapping portions thereof to form a seamed tube; a shaft; actuating means driven from said shaft for moving said mandrel, said laterally movable plates and said bar; means for ejecting a seamed tube from said mandrel, and means controlled by the abnormal presence of a blank adjacent said mandrel for preventing the operation of said actuating means until the abnormality has been removed.

4. A mechanism for forming tubes from sheet metal blanks including a frame; means associated with said frame for supporting sheet metal blanks; a plurality of rotatable forming rolls mounted upon said frame and arranged adjacent said supporting means; air operated servo-motor means for moving the blanks from the support into said forming rolls; a mandrel movably associated with said frame; a resiliently supported anvil disposed beneath said mandrel; means for conveying a blank ejected from said forming rolls to a position between the mandrel and said anvil; actuating means for said blank conveying means including a second air operated servo-motor; a cam shaft; means driven by said cam shaft adapted to move said mandrel and blank associated therewith whereby a U-shaped configuration is imparted to the blank; relatively movable members arranged to form said blank into tubular form whereby edge portions of said blank are caused to be inter-engaged; an element arranged to be moved into contact with the inter-engaging portions of said blank to form a lock seam for the tube; means associated with said cam shaft for actuating said members and said element, and means including electrically controlled instrumentalities for operating said several means in proper sequential relationship.

5. A tube forming machine including in combination, a frame; a support for a sheet metal blank; means for preforming edge portions of the blank; a mandrel; fluid actuated means for feeding the sheet metal blank into the edge forming means; means for conveying the formed blank to a position adjacent the mandrel; said conveying means including a member movable longitudinally of said mandrel; fluid actuated means for operating said member; said blank conveying means including a relatively movable pawl carried by said member and engageable with a blank for moving same from the forming rolls to the mandrel; a shaft; cam means associated with said shaft; mechanism actuated by said cam means for moving the mandrel downwardly to form the blank to U-shaped configuration; cam actuated means engageable with the U-shaped blank for forming the blank into a tube; a cam actuated hammer for lock seaming adjacent overlapping edge portions of the blank, and means associated with said member and engageable with the completed tube for ejecting the latter from the mandrel simultaneously with the conveying of a preformed blank to a position adjacent the mandrel.

JOHN W. MILLER.

(References on following page)

REFERENCES CITED

The following references are of record in the file of this patent:

UNITED STATES PATENTS

| Number | Name | Date |
|---|---|---|
| 489,498 | Pruden | Jan. 10, 1893 |
| 782,017 | Fairman | Feb. 7, 1905 |
| 854,136 | Wiet | May 21, 1907 |
| 1,086,700 | Clark | Feb. 10, 1914 |
| 1,120,547 | Sazenhofen | Dec. 8, 1914 |
| 1,126,691 | Blackburn | Feb. 2, 1915 |
| 1,369,934 | Onstad | Mar. 1, 1921 |
| 1,371,833 | Youtsey | Mar. 15, 1921 |
| 1,429,328 | Domizi | Sept. 19, 1922 |
| 1,468,754 | Smith | Sept. 25, 1923 |
| 1,758,237 | Paine | May 13, 1930 |
| 1,772,820 | Troyer | Aug. 12, 1930 |
| 1,863,770 | Hendrickson | June 21, 1932 |
| 1,917,359 | Cameron | July 11, 1933 |
| 1,941,953 | Pum | Jan. 2, 1934 |
| 2,158,176 | Dewey | May 16, 1939 |
| 2,220,909 | Kershaw | Nov. 12, 1940 |